US008630990B2

(12) United States Patent
Gowel

(10) Patent No.: US 8,630,990 B2
(45) Date of Patent: Jan. 14, 2014

(54) SOFTWARE TRAINING SYSTEM INTERACTING WITH ONLINE ENTITIES

(75) Inventor: David M. Gowel, Arlington, MA (US)

(73) Assignee: Rockefeller Consulting Technology Integration, Inc., Cambridge, MA (US)

( * ) Notice: Subject to any disclaimer, the term of this patent is extended or adjusted under 35 U.S.C. 154(b) by 214 days.

(21) Appl. No.: 13/166,444

(22) Filed: Jun. 22, 2011

(65) Prior Publication Data

US 2012/0072416 A1    Mar. 22, 2012

Related U.S. Application Data

(60) Provisional application No. 61/384,563, filed on Sep. 20, 2010.

(51) Int. Cl.
*G06F 17/30* (2006.01)
(52) U.S. Cl.
USPC .......................................... 707/705; 707/706
(58) Field of Classification Search
USPC ................................................ 707/705, 706
See application file for complete search history.

(56) References Cited

U.S. PATENT DOCUMENTS

| 2002/0199118 | A1* | 12/2002 | Yardley et al. | 713/201 |
|---|---|---|---|---|
| 2003/0018510 | A1* | 1/2003 | Sanches | 705/9 |
| 2003/0195838 | A1* | 10/2003 | Henley | 705/37 |
| 2004/0030566 | A1* | 2/2004 | Brooks Rix | 705/1 |
| 2006/0026033 | A1 | 2/2006 | Brydon et al. | |
| 2009/0043789 | A1 | 2/2009 | Gupta | |
| 2009/0049106 | A1 | 2/2009 | Bommireddipalli et al. | |
| 2010/0280962 | A1* | 11/2010 | Chan | 705/301 |
| 2012/0217652 | A1* | 8/2012 | Pratt | 257/774 |

\* cited by examiner

*Primary Examiner* — Baoquoc N To
(74) *Attorney, Agent, or Firm* — Wolf, Greenfield & Sacks, P.C.

(57) ABSTRACT

A non-transitory processor-readable medium stores code representing instructions configured to cause a processor to send a first signal to cause a client device to display an instruction directing a user to perform a task associated with a user profile of an online entity. The code is configured to cause the processor to produce a query formatted according to an API associated with the online entity. The code is configured to cause the processor to send a second signal including the query to at least one of the client device or the online entity, and receive a third signal including a datum associated with the task. The code is configured to cause the processor to update a status of the indicated task based on the datum, and send a fourth signal to cause the client device to produce an indication associated with the status of the task.

18 Claims, 21 Drawing Sheets

FIG. 17

SOFTWARE TRAINING SYSTEM INTERACTING WITH ONLINE ENTITIES

CROSS-REFERENCE TO RELATED APPLICATIONS

This application claims priority under 35 U.S.C. §119(e) to U.S. Provisional Application Ser. No. 61/384,563, entitled "Software E-Learning System Interacting With Social Network Applications Via An API," filed Sep. 20, 2010, which is incorporated herein by reference in its entirety.

BACKGROUND

Some embodiments described herein relate generally to proctored e-learning systems, and more particularly to methods and apparatus for verifying that certain tasks, for which instructions have been provided via an e-learning training system, have been successfully completed.

Many known computer-based training courses are relatively static in nature, presenting the student with a set of slides or instructions directed towards the subject matter, such as, for example, the use of an online entity. Some known computer-based training courses, present instructions to maximize use of a selected social network, such as LinkedIn, Facebook, MySpace, Twitter, etc. Such courses do not, however, interact directly with the social network to track the student's progress towards goals, nor do they validate interactions performed by the student concurrently and within the social network itself. Thus, a need exists for improved online networking training systems that teach improved use of social networks, by integrating the training system with the social network itself through an Application Programming Interface (API) and/or other available interface technology.

SUMMARY

In some embodiments, a non-transitory processor-readable medium stores code representing instructions configured to cause a processor to send a first signal configured to cause a client device to display an instruction directing a user to perform an indicated task associated with a profile of the user, the profile associated with an online entity. The code is configured to cause the processor to produce a query formatted according to a predefined programming interface (e.g., an API) associated with the online entity, the query based at least in part on an identification of the user and the indicated task. The code is configured to cause the processor to send a second signal including the query to at least one of the client device or a server device associated with the online entity. The code is configured to cause the processor to receive a third signal including a datum associated with the indicated task, the third signal formatted according to the predefined programming interface. The code is configured to cause the processor to update a status of the indicated task based at least in part on the datum, and send a fourth signal configured to cause the client device to produce an indication associated with the status of the indicated task.

BRIEF DESCRIPTION OF THE DRAWINGS

FIGS. 16-18 are screen shots showing sample reports according to an embodiment.

DETAILED DESCRIPTION

Figure 1:
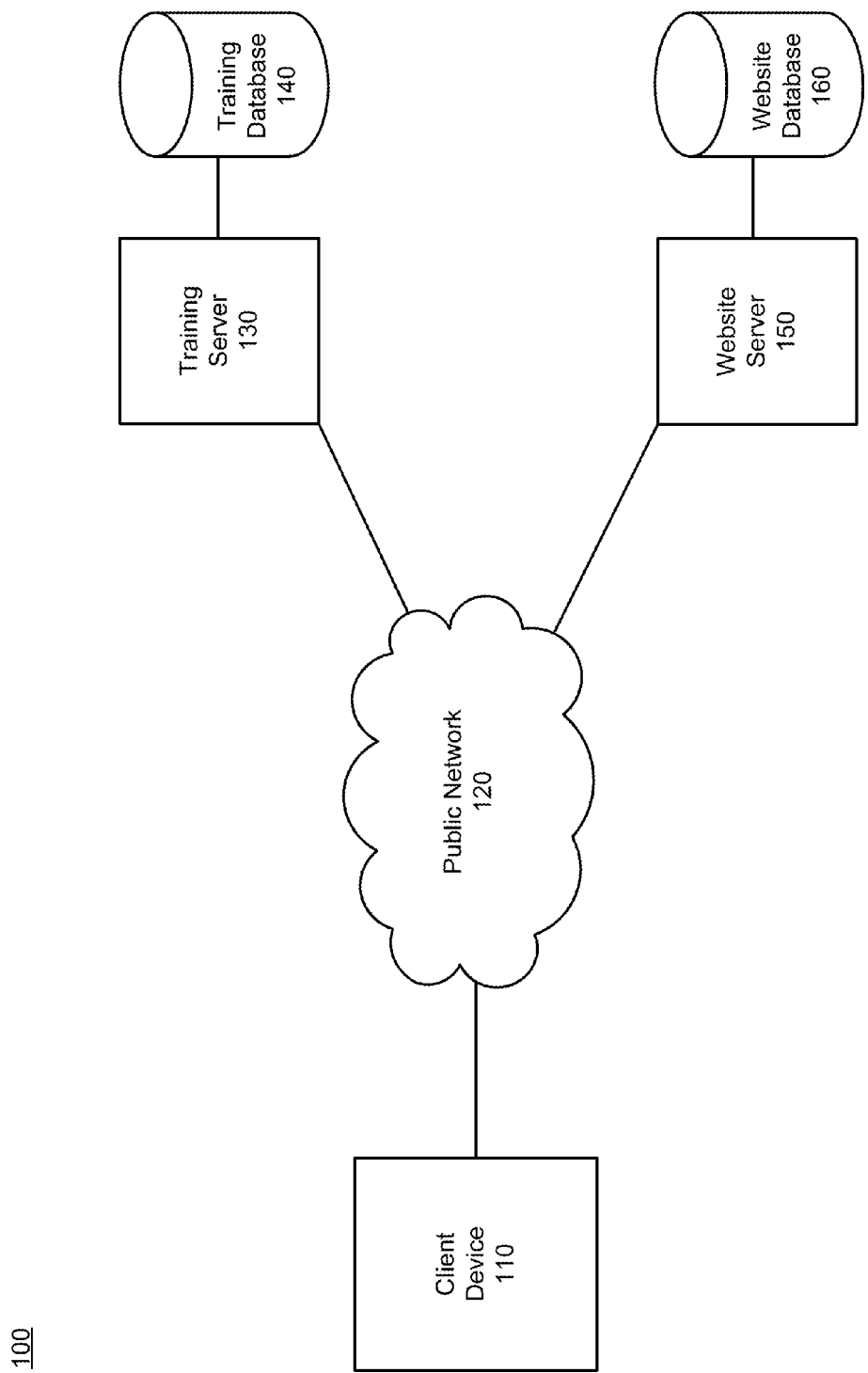
FIG. 1 is a schematic block diagram that illustrates an API-based online training system, according to an embodiment.

In some embodiments, a training server associated with an online training course can be in communication with a client device and/or a server of a third-party online entity (e.g., a social network). The training server can be configured to provide/send website/webpage content to the client device for display thereby. For example, the training server can send webpage content (e.g., Hypertext Markup Language (HTML) content, text, graphics, video and/or other media content) for display by the client device (e.g., via a web browser application executing thereat).

In some embodiments, the training server can be any valid combination of hardware and/or software (e.g., a web server and/or application server) configured to: (1) track progress of one or more user accounts within one or more online training courses related to a third-party online entity; (2) provide web content including instruction regarding one or more training tasks related to the third-party online entity; (3) communicate with a client device and/or server of the third-party online entity to determine, based on a common data exchange format, whether a user of the training course has successfully completed one or more indicated training tasks included in the training course and associated with a user profile/user account associated with that third-party online entity; and/or (4) produce a ranking of a user profile/user account based on the information received from the third-party online entity. The third-party online entity can be any online entity, website, service, etc. configured to provide services, functionality and/or connectivity to a user thereof. For example, the third-party online entity can be a social network service, such as LinkedIn, Facebook, Orkut, etc. In other embodiments, the third-party online entity can be any suitable online entity, such as for example, SalesForce.com.

The client device can be any computing device (e.g., a personal desktop or laptop computer, mobile computing device, etc.) configured to connect to/communicate with the training server and a server (or other device) of the third-party online entity. In some embodiments, the client device can execute and display a web browser application for interaction with by the user. The web browser application can be configured to exchange information (e.g., data packets, signals, Hypertext Transfer Protocol (HTTP) requests/responses, etc.) with the training server and/or the one or more devices associated with the third-party online entity. The web browser application ("web browser") can be configured to display webpage content received from both the training server and the server of the third-party online entity, such that a user thereof may use the browser to (1) receive training task instruction included in the webpage content from the training server and (2) complete one or more training tasks via the webpage content from the third-party online entity.

In some embodiments, the web browser executing at the client device can receive and display webpage content received from the training server. The webpage content can include, for example, text, graphics and/or other information associated with a training course based on the third-party online entity. For example, the webpage content can include information associated with a training course configured to instruct users thereof how to complete one or more training tasks associated with the third-party online entity. More specifically, the webpage content can include screenshots, slides, videos, images, text, interactive content and/or other content designed to illustrate how the user can interact with a webpage/web content of the third-party online entity to complete the one or more training tasks.

In some embodiments, the web browser can also display webpage content received from a server of the third-party online entity. The web browser can optionally display this webpage content in a same content pane, page, window, or tab as the webpage content received from the training server. For example, the web browser can display the webpage content received from the training server (described above) in a first frame/portion of the web browser content pane, and display the webpage content received from the third-party online entity in a second frame/portion of the web browser content pane. In this manner, the web browser can simultaneously display both training task information and a portion of a webpage of the third-party online entity at/through/via which the training task can be performed by the user. In some embodiments, the client device/web browser can request and receive the webpage content associated with the third-party entity in response to/based at least in part on one or more instructions (e.g., HTML tags) received from the training server (e.g., embedded within the webpage content associated with the training course).

Having displayed webpage content associated with both the training course (or specific task) and the third-party online entity, the web browser executing at the client device can receive one or more user inputs/input signals directed at the portion of the web browser displaying the webpage content from the third-party online entity. Based at least in part on these received input signals, the web browser can send one or more signals (e.g., HTTP packets) to a server associated with the third-party online entity. In this manner, the client device/web browser can execute/perform/provide functionality allowing the user to execute commands designed to complete a training task included in the training course. For example, the web browser can receive one or more user mouse-clicks, text inputs, etc., and can, for example, accordingly update social network profile information (e.g., profile photo, status message, contact list requests/information, etc.) associated with a user account of the user associated with the third-party online entity.

The web browser executing at the client device can next receive, within the portion of the web browser displaying the training course information, one or more user inputs indicating completion of a specified training task associated with the training course. Based at least in part on this input, the client device/web browser can accordingly send one or more signals, formatted according to an Application Programming Interface (API) of the third-party online entity, to a device of the third-party online entity. The one or more signals can include, for example, a query configured to determine whether the training task has in fact been successfully completed as indicated by the user. For example, the query can be configured to determine whether the user has successfully added a desired number of social network contacts, successfully uploaded a profile photo, etc.

In some embodiments, the one or more signals can include multiple different queries configured to result in the receipt of different data from the third-party online entity. The different queries can be collectively formulated and/or formatted according to the API of the third-party online entity such that the aggregation of the different data resulting from the different queries can be used to determine the degree to which (or the effectiveness with which) the training task has been completed. For example, the different queries can be collectively configured to determine whether the user has successfully added a target number of social network contacts having a particular characteristic (e.g., being associated with a particular industry, having achieved a particular level of advancement, having a particular type of educational degree or the like). In this manner, the training server and/or the system can produce a ranking of the degree to which the user is completing the training task and/or the degree to which the user is applying the objectives set forth in the training task.

Although the client device/web browser can send one or more signals, formatted according to the API of the third-party online entity, based at least in part on input received from the user, in other embodiments, the client device, web browser and/or training server can send the one or more signals at a predetermined time. Similarly stated, in some embodiments, the "polling" of the third-party online entity can be time-based rather than input-based.

In some embodiments, the time-based polling can include a series of signals each sent at a predetermined time interval after the previous query and/or at a predetermined time interval after the delivery of the training task. This "periodic polling" can be used, for example, to verify that the training task has been successfully completed after the training task and/or training course has been delivered. For example, in some embodiments, the user may not complete a training task contemporaneously with the delivery of the instructions to the client device. In such situations, the training server and/or the client device can periodically poll the third-party online entity to continually monitor whether the user has completed the training task. This arrangement allows the training server and/or the client device to detect updates to the user's account associated with the third-party online entity that are made at a later time after the delivery of the training course and/or that are made by the user through an interface other than the training interfaces described herein.

The web browser executing at the client device can subsequently receive a response to any of the above-described, API-based signals and/or queries from a device associated with the third-party online entity. In some embodiments, the response can indicate whether the user has in fact completed the training task and/or can include information sufficient to enable the web browser to determine whether the user has completed the training task.

Based at least in part on the received response, the web browser can display one or more messages and/or media configured to indicate whether the training task was successfully completed. More particularly, in some embodiments, the web browser can display a notification stating whether the user has successfully completed the training task and a user interface through which user input associated the training task or a subsequent training task (e.g., the next task in the training course) can be received. Similarly stated, if the training task was successfully completed, the web browser can optionally receive a user input indicating a selection of a subsequent training task from the training course. If the training task was not successfully completed, the web browser can optionally receive subsequent user input within the portion of the content pane associated with the third-party online entity, the subsequent user input configured to complete the training task.

In some embodiments, a non-transitory processor-readable medium stores code representing instructions configured to cause a processor to send a first signal configured to cause a client device to display an instruction directing a user to perform an indicated task associated with a profile of the user, the profile associated with an online entity. The indicated task can include, for example, The code is configured to cause the processor to produce a query formatted according to a predefined programming interface (e.g., an API) associated with the online entity, the query based at least in part on an identification of the user and the indicated task. The code is configured to cause the processor to send a second signal including the query to at least one of the client device or a server device associated with the online entity. The code is configured to cause the processor to receive a third signal including a datum associated with the indicated task, the third signal formatted according to the predefined programming interface. The code is configured to cause the processor to update a status of the indicated task based at least in part on the datum, and send a fourth signal configured to cause the client device to produce an indication associated with the status of the indicated task.

In some embodiments, a method includes sending a first signal to a client device enabling the client device to display an instruction. The instruction can direct a user to update a portion of the user's profile associated with an online entity. For example, the instruction can direct the user to add a certain number of new contacts having certain characteristics by a target date. A second signal including a query based at least in part on an identification of the user is sent to a server device associated with the online entity. The second signal and/or the query can be formatted according to and/or based upon an (API) associated with the online entity. A third signal including a datum associated with the profile of the user is received from the server device. The method further includes producing a ranking of the profile of the user based at least in part on the datum.

In some embodiments, a computer system for delivering a training program includes a memory and a plurality of modules configured to deliver the training program to a client device via a network operatively coupled to the computer system. At least a portion of at least one of the plurality of modules is stored in at least a portion of the memory. The plurality of modules includes a training module and a validation module. The training module is configured to send a first signal configured to cause the client device to display an instruction from the plurality of instructions. The instruction directs a user to perform an indicated task associated with a user profile associated with an online entity. The validation module is configured to produce a query formatted according to a predefined programming interface associated with the online entity. The query is based at least in part on an identification of the user and the indicated task. The validation module is configured to send a second signal including the query to at least one of the client device or a server device associated with the online entity and receive a third signal including a datum associated with the indicated task. The validation module is configured to update a status of the indicated task based at least in part on the datum.

FIG. 1 is a schematic block diagram that illustrates an API-based online training system, according to an embodiment. More specifically, FIG. 1 illustrates a client device 110 operatively coupled to and in communication with a training server 130 and a website server 150 via a public network 120. The training server 130 is operatively coupled to and in communication with a training database 140, and the website server 150 is operatively coupled to and in communication with a website database 160.

The client device 110 can be any mobile or stationary client device configured to exchange information with the training server 130 and/or the website server 150 via the public network 120. In some embodiments, the client device 110 can be a personal computer (e.g., a laptop, notebook, netbook computer), a mobile computing device (e.g., a tablet computing device, smartphone, wearable computing device, etc.), or other client computing device capable of displaying content received from a remote server. For example, the client device 110 can be personal computer capable of connecting to the public network 120 and exchanging signals formatted according to the Hypertext Transfer Protocol (HTTP). In the example, the client device 110 can execute a web browser module (e.g., a web browser software program/application executing in hardware) capable of rendering one or more web pages and sending user input based at least in part on the same. The web browser module can be, for example, a Microsoft Internet Explorer, Mozilla Firefox, Google Chrome, Apple Safari, KDE Konqueror software application executing in hardware of the client device 110.

The public network 120 can be any wired and/or wireless public network capable of transmitting signals between two or more devices, such as between two or more client and/or server devices. In some embodiments, the public network 120 can include one or more routing, switching and/or relay devices configured to direct and/or forward network traffic (e.g., information packets formatted according to one or more network protocols). The public network 120 can be, for example a public intranet, extranet or the Internet. In some embodiments, the public network 120 can be comprised of multiple private and/or public networks, such as corporate and/or education-based intranets, personal local area networks (LANs), etc.

The training server 130 can be any combination of hardware and/or software (executing in hardware) configured to send, to a client device (e.g., the client device 110), information associated with a training program based at least in part on a third-party online entity or service. In some embodiments, the training server 130 can be or include a web server module (e.g., a hardware module and/or software module executing in hardware) configured to send one or more web pages (e.g., web page code and/or instructions formatted according to a formatting or programming langue, such as Hypertext Transfer Language (HTML)). The web pages/web page code can include instructions configured to cause a browser or other software module executing at a client device (e.g., the client device 110) to render a web page associated with the training program. In some embodiments, the rendered web pages can be configured to instruct a user regarding use of the third-party website or online service. In some embodiments, the rendered web pages can include code and/or instructions configured to cause a browser to send one or more signals to and/or receive one or more signals from the training server 130 (itself) and/or the website server 150.

The training database 140 can be any valid data store or database storing information associated with one or more training programs and/or users thereof, such as instructions and/or other information associated with one or more training tasks included in a training program or course, information associated with one or more user accounts (e.g., user metadata, user training course completion status), etc. The training database 140 can be, for example, a relational database system, such as an Oracle, Microsoft SQL Server, Microsoft Access, PostgreSQL, MySQL, Informix or other database type. Although shown in FIG. 1 as being a separate device, in some embodiments, the training database 140 can be included in the training server 130 and/or co-located with the training server 130 within a single physical device.

The website server 150 can be any combination of hardware and/or software (executing in hardware) configured to serve (i.e., send) one or more webpages (e.g., web page content defined by a web page language, such as HTML) for processing and/or rendering by a browser of a client device (e.g., the browser of the client device 110 as described above). In some embodiments, the website server 150 can be associated with and can serve content related to a social network site and/or another website having multiple user accounts, each associated with a user (e.g., a human user). Although the website server 150 is shown as being distinct from the training server 130, in other embodiments, the website server 150 and the training server 130 can be coupled together via a private network and/or other hardware connections. Similarly stated, in some embodiments, the website server 150 need not be distinct from the training server 130.

The website database 160 can be any valid data store or database storing information associated with one or more websites, such as website content (e.g., text, HTML code, images, other media, etc.) In some embodiments, the website database 160 can store information associated with the one or more user accounts described in connection with the website server 150 above. The website database 160 can be, for example, a relational database system, such as an Oracle, Microsoft SQL Server, Microsoft Access, PostgreSQL, MySQL, Informix or other database type. Although shown in FIG. 1 as being a separate device, in some embodiments, the website database 160 can be included in the website server 150 and/or co-located with the website database 160 within a single physical device.

Figure 2:
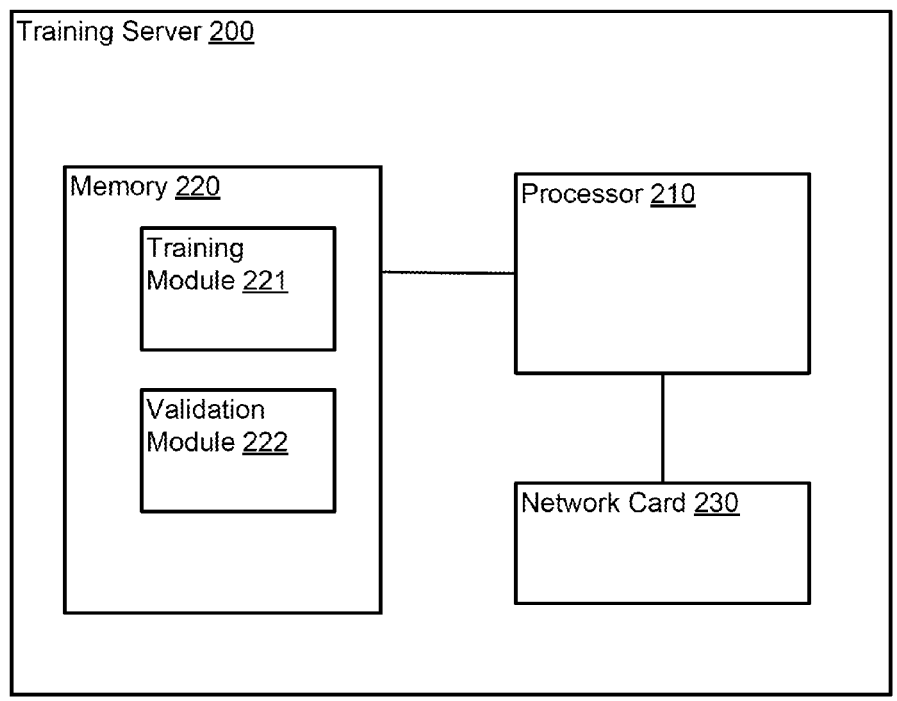
FIG. 2 is a schematic block diagram that illustrates a training server included in an API-based online training system, according to another embodiment.

FIG. 2 is a schematic block diagram that illustrates a training server (such as the training server 130) included in an API-based online training system, according to another embodiment. More specifically, FIG. 2 illustrates a training server 200 including a processor 210, a memory 220 and a network card 230. As also shown in FIG. 2, the processor 210 can be physically and/or operatively coupled and in communication with the memory 200 and the network card 230. The memory 220 can include a training module 221 and a validation module 222. In some embodiments, the training server 200 can include additional hardware modules and/or software modules (executing in hardware or stored in memory) not shown in FIG. 2. For example, the training server 200 can include one or more input devices and/or peripherals, one or more data input ports, etc.

The processor 210 can be any processor (e.g., a central processing unit (CPU), an application-specific integrated circuit (ASIC), and/or a field programmable gate array (FPGA)) configured to execute one or more instructions received from, for example, the memory 220. In some embodiments, the processor 210 can be a Reduced Instruction Set computing (RISC) processor. As shown in FIG. 2, the processor 210 can be in communication with any of the memory 220 and the network card 230. In some embodiments, the processor 210 can accordingly send information (e.g., data, instructions and/or network data packets) to and/or receive information from any of the memory 220 and the network card 230.

The memory 220 can be any memory (e.g., a RAM, a ROM, a hard disk drive, an optical drive, other removable media) configured to store information (e.g., one or more software applications, training course/task information, user account information, media, text, etc.). As shown in FIG. 2, the memory 220 includes the training module 221 and the validation module 222. In some embodiments, the memory 220 can include instructions (e.g., code) sufficient to define and/or execute the training module 221 and/or the validation module. The training module 221 can be configured to receive user input from a client device and/or send, to the client device, content (e.g., web content, such as HTML, media files, etc.) such that one or more training courses is administered at a software module (e.g., a web browser) executing at the client device. The validation module 222 can exchange information with one or more third-party devices, such as a third-party web server, database, or other resource storing information associated with a third-party website (e.g., a social networking website) and one or more users/user accounts thereof. In some embodiments, the validation module 222 can send and/or receive the above-described information, signals and/or packets via the network card 230 (described below). In this manner, the validation module 222 can proctor and/or validate whether the training course administered has been successfully completed, in any manner as described herein. In some embodiments, the validation module 222 can determine the degree to which (or the effectiveness with which) a training task produced by the training module 221 has been completed. Moreover, in some embodiments, the validation module 222 can produce a ranking of the degree to which the training task has been completed and/or the degree to which a user is applying the objectives set forth in the training task.

Although the memory 220 is shown as including a training module 221 and a validation module 222, in other embodiments, the functions described herein can be performed by any number of modules. For example, in some embodiments, the functions described herein can be performed by a single module.

The memory 220 can also alternatively store one or more resources (e.g., software resources such as drivers, code libraries, etc.) (not shown in FIG. 2) associated with the training module 221. In some embodiments, the memory 220 can further store device identifier (ID), software module ID, hardware component ID and/or other relevant information associated with the training server 200.

The network card 230 can be a hardware module (e.g., a wired and/or wireless Ethernet card, a cellular network interface card) configured to transmit information (e.g., data packets, cells, etc.) from and receive information at the training server 200. As shown in FIG. 2, the network card 230 can be operatively and/or physically coupled to the processor 210. In this manner, the processor 210 can, via the network card 230, exchange information with one or more other devices via a network (e.g. the public network 120 discussed in connection with FIG. 1 above).

Figure 3:
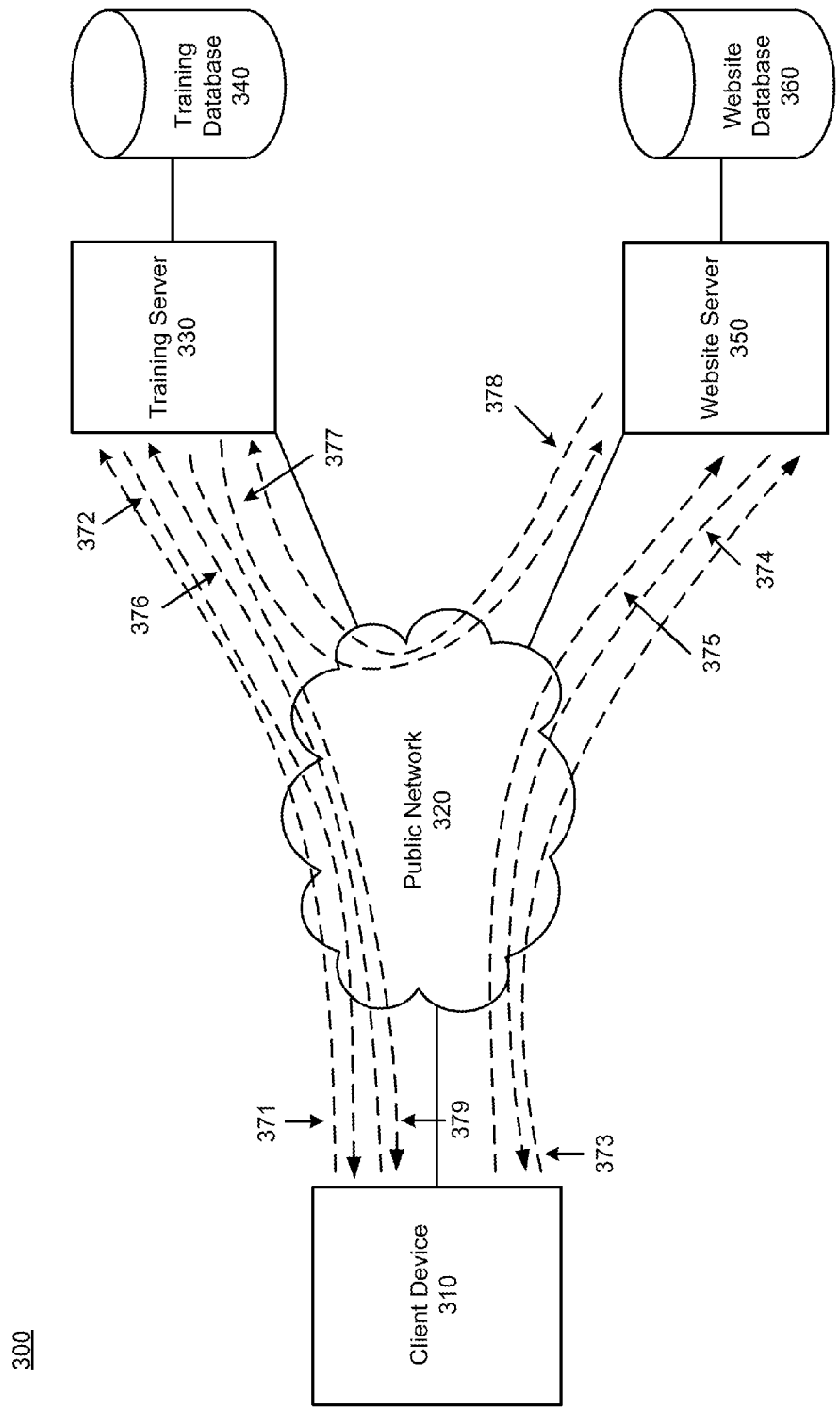
FIG. 3 is a schematic block diagram that illustrates a process of providing online instruction regarding an online training task associated with a third-party entity and verifying successful completion of the same via one or more API calls, according to another embodiment.

FIG. 3 is a schematic block diagram that illustrates one or more processes of providing online instruction associated with a third-party online entity, and verifying successful completion of the instruction via one or more API calls, according to an embodiment. More specifically, FIG. 3 illustrates a client device 310 operatively coupled to and in communication with a training server 330 and a website server 350 via a public network 320. The training server 330 is operatively coupled to and in communication with a training database 340, and the website server 350 is operatively coupled to and in communication with a website database 360. The processes of providing online instruction and verifying successful completion of the instruction are also explained below with reference to FIGS. 4-14, which show sample screen shots of webpage information and/or content rendered by the client device 310.

The client device 310 can be any client computing device configured to and/or capable of exchanging data with one or more other computing devices (e.g., servers) via, for example, a computer network (e.g., the public network 320). The client device 310 can be, for example, a personal computer, tablet computing device, laptop, notebook, netbook, smart phone, other mobile computing device, etc. In some embodiments, the client device 310 can be substantially similar to the client device 110 described in connection with FIG. 1. As shown in FIG. 3, the client device 310 can be operatively and/or physically coupled and in communication with the training server 330 and the website server 350 via the public network 320.

The public network 320 can be any public computer network configured to transmit, transfer, route, forward, direct and/or deliver computer network traffic (e.g., network packets). In some embodiments, the public network 320 can be a wide area network (WAN), public local area network (LAN), or the Internet. As shown in FIG. 3, the public network 320 can be operatively and/or physically coupled to and in communication with the client device 310, the training server 330 and the website server 350. In some embodiments, the public network 320 can be substantially similar to the public network 120 described in connection with FIG. 1 above.

The training server 330 can be any valid combination of hardware and/or software (executing in hardware) configured to administer an API-based online training program/service associated with a third-party online entity. In some embodiments, the training server 330 can be a server device storing web page code (e.g., HTML, JavaScript, etc.) and/or other logic and/or modules configured to provide a user of the client device 310 with instruction and functionality to allow the user to complete one or more training tasks associated with the third-party online entity. In some embodiments, the code, logic and/or modules can be configured to query one or more resources associated with the third-party online entity to verify successful completion by the user of the one or more training tasks. In some embodiments, the code, logic and/or modules can be configured to query one or more resources associated with the third-party online entity to determine the degree to which the user is applying the objectives set forth in a training task, as described herein. To do so, the training server 330 can send, to a website server of the third-party online entity (e.g., the website server 350), one or more signals including one or more queries (e.g., API-based data queries). In this manner, the training server 330 can provide verified or proctored instruction to a user of the client device 310 to ensure successful completion of training tasks. In some embodiments, the training server 330 can be substantially similar to the training server 130 described in connection with FIG. 1 above.

The training database 340 can be any valid memory, data store and/or database configured to store information associated with a training program administered by the training server 330. As shown in FIG. 3, the training database 340 is operatively and/or physically coupled to the training server 330, and in communication with the same. In this manner, the training database 340 can provide data to the training server 330 for use in administering one or more training courses associated with a third-party online entity. In some embodiments, the training database 340 can be a relational database, such as an Oracle, Microsoft SQL Server, PostgreSQL, MySQL, Informix, Sybase, or other database type. The training database 340 can optionally include and/or store information associated with a training course/program associated with a third-party online entity (or multiple courses associated with multiple online entities). This information can include, for example, training tasks with associated text, media and webpage code. In some embodiments, the training database 340 can store information associated with the progress of each user of a given training course within that training course. For example, the training database 340 can store one or more records indicating that a first user of a first training course has completed five of ten tasks (i.e., 50%) of the second training course, and that a second user of a second training course has completed 1 of 4 tasks (i.e., 25%) of the second training course. In this manner, the system can produce a ranking of a user profile/user account based on the information stored within the training database 340. In some embodiments, the training database 340 can be substantially similar to the training database 140 described in connection with FIG. 1 above.

The website server 350 can be any combination of hardware and/or software (executing in hardware) configured to serve webpages associated with the third-party online entity. For example, the website server 350 can serve/provide webpage code (e.g., HTML, JavaScript, etc.), media and/or other information associated with a social network site. In some embodiments, the website server 350 can receive and respond to API-based queries, i.e., queries for data associated with the third-party online entity received from an outside source. The API-based queries can be organized/structured according to a predetermined format defined by one or more APIs associated with the third-party online entity and configured to allow/enable retrieval of information associated with the third-party online entity. For example, an API query can include a request for name information associated with all users of the third-party online entity having attended a specified educational institution, for all photo information associated with a specified user of the third-party online entity, or for a total number of users of the third-party online entity having a specified birthdate. In some embodiments, the website server 350 can be substantially similar to the website server 150 described in connection with FIG. 1 above.

The website database 360 can be any valid memory, data store and/or database configured to store information associated with a website hosted/served/provided by a third-party online entity via the website server 350. As shown in FIG. 3, the website database 360 is operatively and/or physically coupled to the website server 350, and in communication with the same. In this manner, the website database 360 can provide data to the website server 350 for use in administering one or more websites and/or responding to one or more data requests (e.g., API requests). In some embodiments, the website database 360 can be a relational database, such as an Oracle, Microsoft SQL Server, PostgreSQL, MySQL, Informix, Sybase, or other database type. The website database 360 can optionally include and/or store information associated with one or more users of the third-party online entity. For example, if the third-party online entity is a social network, the website database 360 can store profile information associated with one or more users/user accounts associated with the social network. The profile information can include, for example, name, birthdate, education, hometown and/or other personal information associated with a user. The profile information can further include information related to one or more social network contacts of the user, one or more photos including and/or associated with the user, social network activity or content associated with or generated by the user, etc. In some embodiments, the website database 360 can be substantially similar to the website database 360 described in connection with FIG. 1 above.

Figure 4:
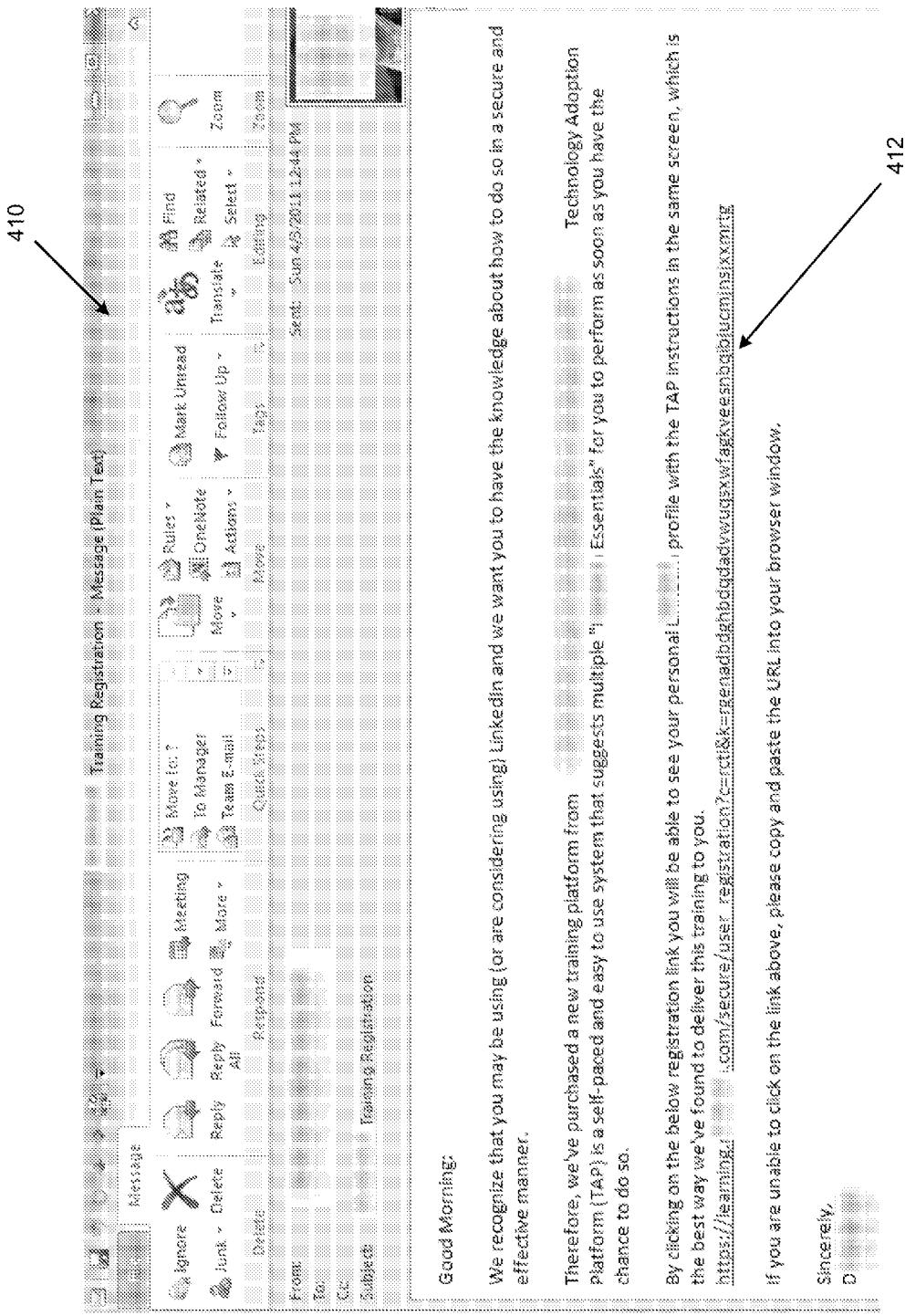
FIG. 4 is a screen shot of a webpage showing a sample registration e-mail according to an embodiment.

Before beginning the online instruction processes described below, in some embodiments, the user can first provide registration information to the training server 330. Similarly stated, in some embodiments, the training server 330 receives signals and/or information (not shown in FIG. 3) associated with the registration of the user. Such registration information can include, for example, an identification of the user, a password to be associated with the user's account on the training server 330, demographic information associated with the user and/or payment information associated with the training program. In some embodiments, at least a portion of the registration information can be sent in response to input received via a registration notification displayed at the client device 310 requesting that the user register for the training course. The registration notification can be sent in any suitable format, such as for example, via e-mail. FIG. 4 is a screen shot showing a sample registration e-mail 410 displayed at the client device 310. In this example, the registration e-mail 410 includes a link 412 through which the training server 330 can be accessed to provide registration information.

Figure 5:
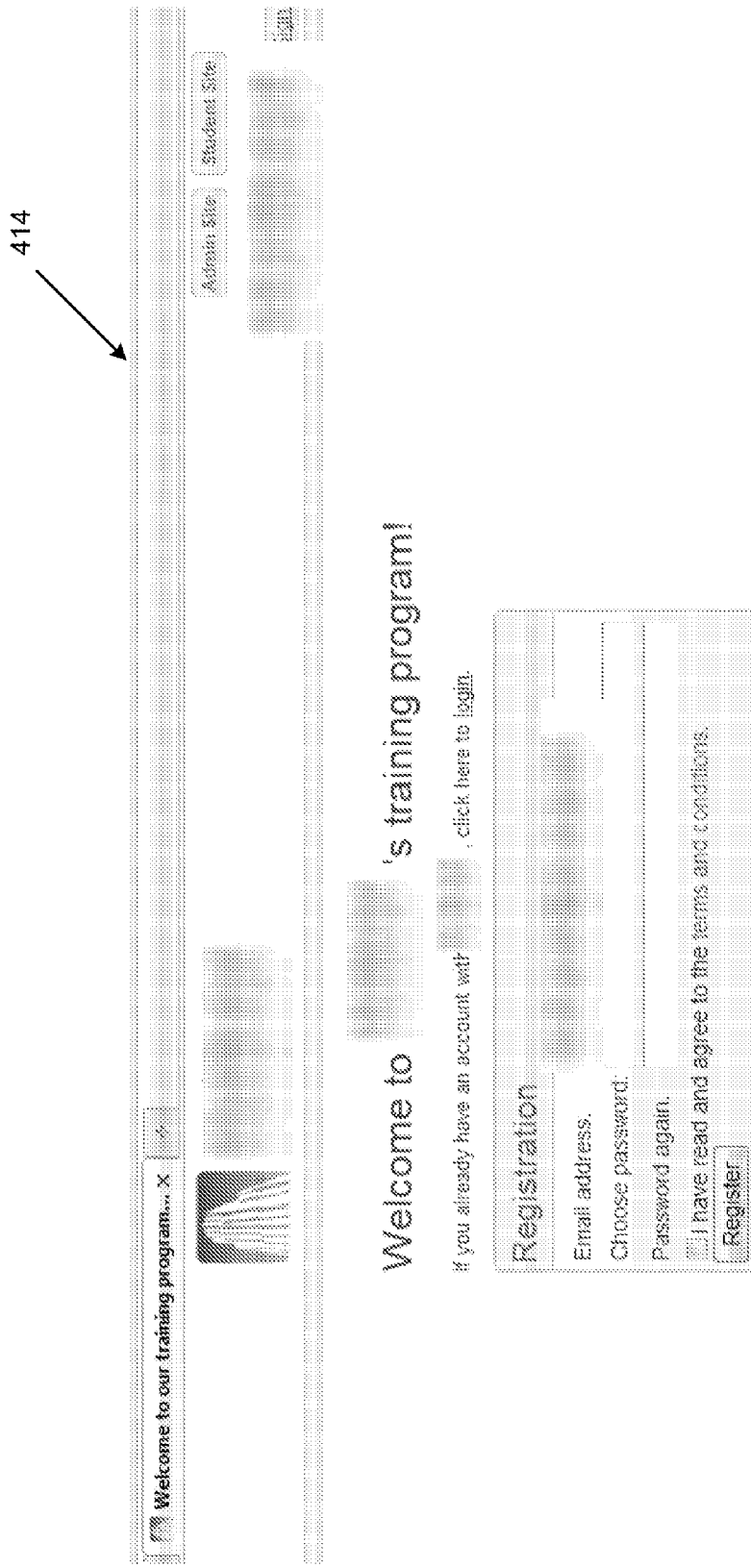
FIG. 5 is a screen shot of a webpage showing a sample registration user interface according to an embodiment.

In other embodiments, at least a portion of the registration information can be sent in response to input received via a user interface and/or input dialog box displayed at the client device 310. The user interface and/or input dialog box can be rendered at the client device 310 based on webpage information and/or content received from the training server 330. FIG. 5 is a screen shot showing a sample registration user interface 414 displayed at the client device 310. In this example, the registration user interface 414 prompts the user to select a password, which is the conveyed to the training server 330 and/or the training server database 340.

In addition to providing registration information to establish the user's account and/or profile with the training server 330, in some embodiments, the user can provide access information to the training server 330, which is used by the training server 330 to access information associated with the user's account and/or profile with the third-party online entity via the website server 350. Similarly stated, in some embodiments, the training server 330 sends and/or receives signals and/or input (not shown in FIG. 3) associated with the user's account and/or profile with the third-party online entity. In this manner, the training server 330 sends and/or receives information associated with two accounts and/or profiles of the user: the user's training account and the user's account with the third-party online entity. The access information can include, for example, an identification of the user's account with the third-party online entity and/or an indication of the user's permission for the training server 330 to access the website server 350 to retrieve information from the user's account with the third-party online entity.

Figure 6:
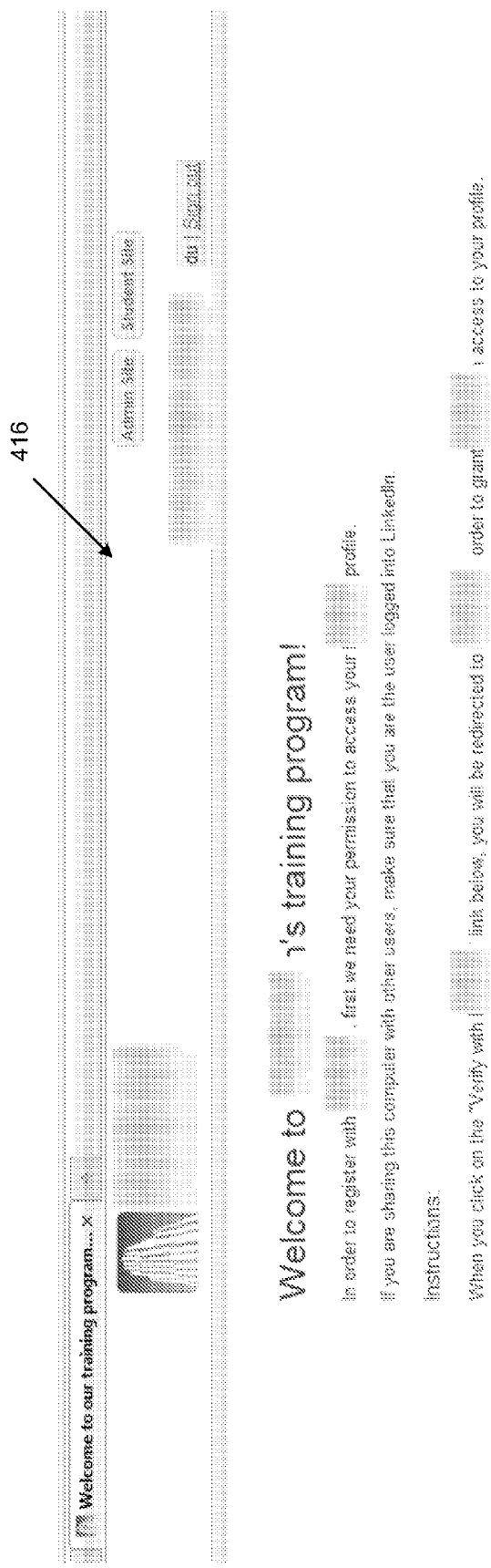
FIG. 6 is a screen shot of a webpage showing a sample access interface according to an embodiment.
Figure 7:
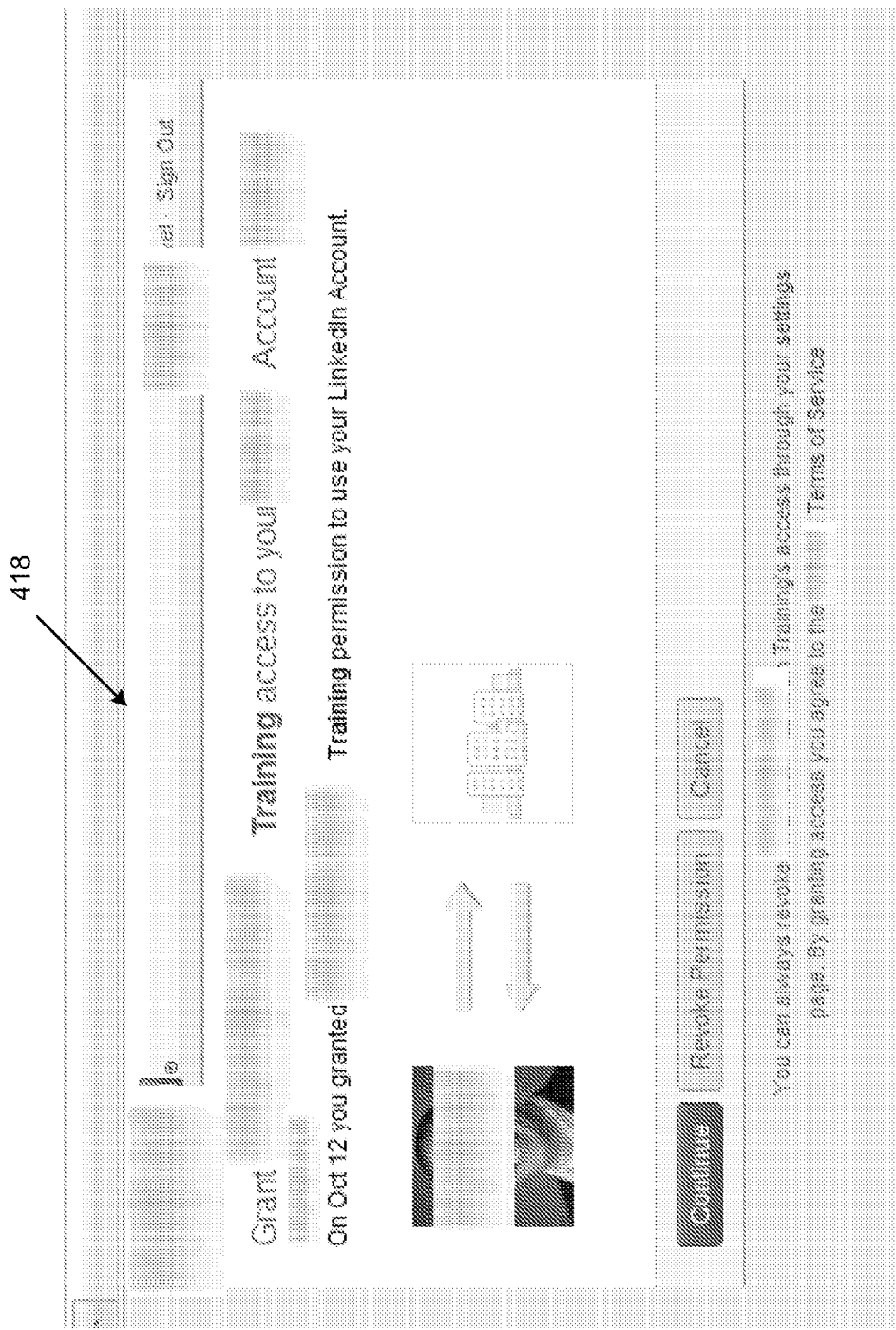
FIG. 7 is a screen shot of a webpage showing a sample verification notification according to an embodiment.

In some embodiments, the client device 310 can send a signal (not shown in FIG. 3) to the website server 350 prompting the website server 350 to send a signal causing the client device 310 to render and/or display an access webpage and/or content associated with the third-party online entity. More specifically, the webpage and/or content associated with the third-party online entity can prompt the user to authorize the training server 330 to access information associated with the user's account and/or profile with the third-party online entity via the website server 350. FIG. 6 is a screen shot showing a sample access interface 416 displayed at the client device 310. In this example, the access interface 416 prompts the user to select a link 417, which causes a signal to be sent from the client device 310 to the website server 350. When the link 417 is selected, the website server 350 sends a signal causing the client device 310 to render and/or display an access webpage associated with the third-party online entity. In some embodiments, the client device 310 can produce an indication verifying that the user has granted permission for the training server 330 to access the website server 350 to retrieve information from the user's account with the third-party online entity. FIG. 7 is a screen shot showing a sample verification notification 418 displayed at the client device 310.

Referring to FIG. 3, the client device 310 can send a signal 371 to the training server 330 via the public network 320. The signal 371 can include, for example, a request (e.g., an HTTP request) for webpage information associated with a training course, registration and/or identification information associated with the user, or the like. In some embodiments, the signal 371 can be sent in response to a user input received at the client device 310 that indicates a request to commence activity within a training course associated with a third-party online entity. Similarly stated, in some embodiments, the signal 371 can be sent in response to input received via a user interface and/or notification displayed at the client device 310 requesting that the user begin and/or continue the training course.

Figure 8:
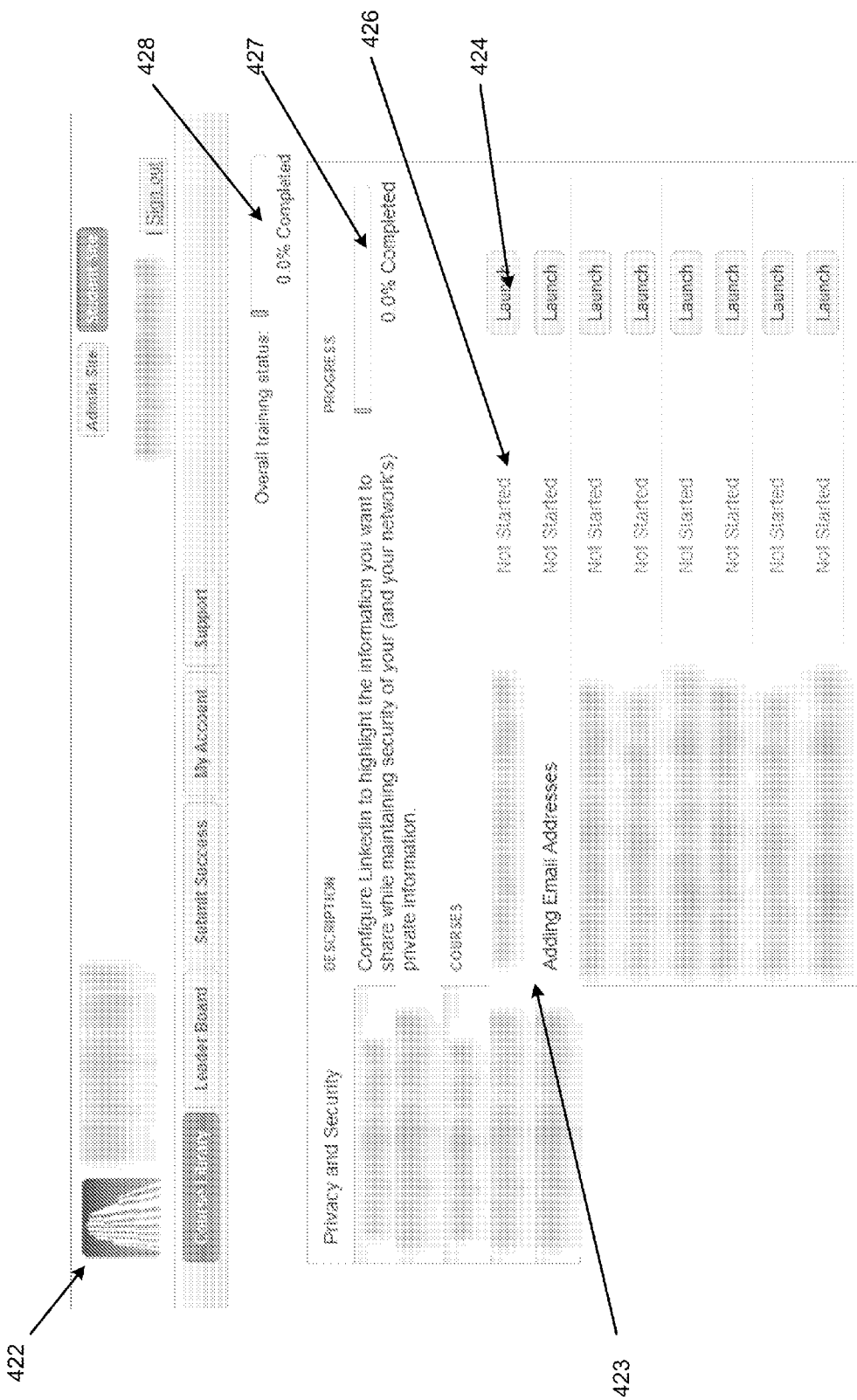
FIG. 8 is a screen shot of a webpage showing a training course webpage according to an embodiment.

For example, in some embodiments, after sending the registration information and/or access information, as described above, the training server 330 can send a signal (not shown in FIG. 3) causing the client device 310 to render and/or display a training course webpage and/or user interface configured to receive user input related to the training course and/or task to be displayed at the client device 310. FIG. 8 is a screen shot showing a sample training course webpage 422 that includes a listing of training tasks and/or courses 423 associated with the third-party online entity that are available from the training server 330. For example, the listing of training tasks 423 can include items such as adding an e-mail address (or other contact information) to the user's account/profile associated with the third-party online entity, adding a profile photo to the user's account/profile associated with the third-party online entity, updating the user's employment or education information in the user's account/profile associated with the third-party online entity or the like. The training course webpage 422 includes an input element 424 (e.g., an on-screen "launch" button) through which the client device 310 can receive user input associated with a particular training task 423. This arrangement allows the signal 371 to be sent in response to the user input received via the input element 424.

Although the user input related to selection of a task is shown as being received via the training course webpage 422, in other embodiments, the user response can be received via a user interface displayed after the user has completed a first training task or course. Thus, in some embodiments, the signal 371 can include a request for information associated with a "next" training task included in the training course, i.e., the next training task in the training course that the user of the client device 310 has yet to complete.

The training course webpage 422 also includes course status indicator 426, a training progress indicator 427 and an overall training status indicator 428. The course status indicator 426 indicates whether the user has started or completed a training task in the listing of training tasks. As discussed in more detail below, the training progress indicator 427 and the overall training status indicator 428 can indicate a percentage or portion of the training course or overall training that has been completed by the user.

The signal 371 can include any suitable information associated with a training task or course. For example, the signal 371 can optionally include information sufficient to identify the user of the client device 310, such as a username and/or other credential associated with a user account of that user registered or recorded at the training server 330 and/or the training database 340. Upon receipt of the signal 371, the training server 330 can determine which webpage information to send/return to the client device 310 for rendering thereat/thereby (e.g., via a web browser executing thereon). To do so, the training server 330 can perform a query (or multiple queries) based at least in part on a received user credential associated with the user of the client device 310. For example, the training server 330 can send one or more queries (not shown in FIG. 3) to the training database 340 and receive corresponding information therefrom.

Having determined the appropriate webpage information, code and/or content associated with the user of the client device 310 and the "next" training task associated therewith, the training server 330 can send a signal 372 to the client device 310 (via the public network 320). The signal 372 can be, for example, an HTTP response. Upon receipt of the signal 372, the client device 310 can render the received training course webpage information/content received from the training server 330. More specifically, the client device 310 can render a portion of a webpage including training instructions associated with the next training task in the current training course.

In some embodiments, the signal 372 can include instructions (e.g., HTML and/or other code) that directs the client device 310 (e.g., a web browser executing thereon) to request additional website/webpage content directly from the website server 350 associated with the third-party online entity. In this manner, the signal 372 can include instructions configured to cause the client device 310 to render both training task information associated with the training course (sent directly from the training server 330) and third-party online entity information associated with a profile of the user. Said differently, the instructions can include (1) information associated with a first user account of that user (the first account being associated with the training course), and (2) instructions configured to cause the client device 310 to request and receive information associated with a second user account of that same user (the second account being associated with the third-party online entity). In such embodiments, upon receipt of the signal 372, in addition to rendering training course webpage information/content received from the training server 330, the client device 310 can also send a query (described below) to the website server 350 to request information associated with a profile (e.g., a social network profile) of the user. More specifically, the client device 310 can send a signal 373 to the website server 350 configured to receive webpage information (e.g., HTML, JavaScript code, media, etc.) associated with a webpage for the profile of the user from the third-party online entity.

Upon receipt of the signal 373, the website server 350 can prepare and send a signal 374 including the requested information to the client device 310 (via the public network 320). To prepare the signal 374, the website server 350 can, for example, query one or more memories or databases (e.g., the website database 360) to determine/gather profile information associated with the user.

Upon receipt of the signal 374 from the website server 350, the client device 310 can render (e.g., at the web browser described above) a portion of a webpage including the received user profile information from the user's third-party online entity profile. As discussed in connection with FIG. 15 below, this webpage portion associated with the user's third-party online entity profile can be included above, below, beside, etc., the rendered/displayed webpage portion that includes user instructions associated with the next training task in the current training course. In this manner, the client device 310 can present to the user both (1) a webpage portion from the user's own third-party online entity profile and (2) a webpage portion including training instructions regarding how to perform one or more tasks related to that profile.

Figure 9:
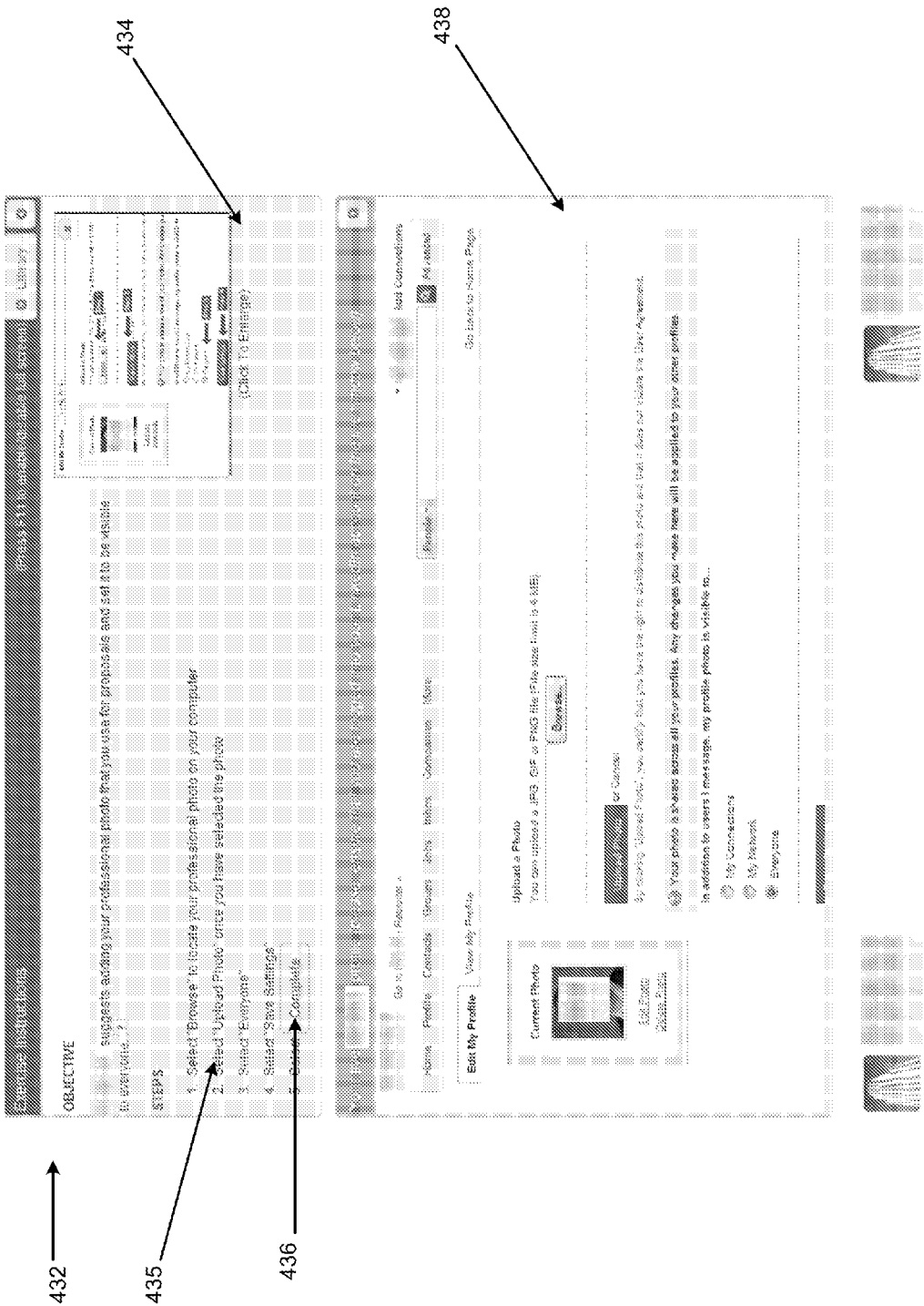
FIGS. 9 and 10 are screen shots of training webpages according to an embodiment.

FIG. 9 is a screen shot showing a sample training webpage 432 that includes a training page portion 434 and an online entity profile portion 438. The training page portion 434 includes training instructions 435 associated with the current training task, such as, for example, instructions for adding a photograph to the user's profile on the third-party online entity. The training page portion 434 also includes an input element 436 (e.g., an on-screen "complete" button) through which the client device 310 can receive user input associated with the completion of the training task. This arrangement allows the user and/or the client device 310 to send a signal to the training server 330 and/or the website server 350 to indicate a possible change in the status (e.g., completion) of the training task and/or the a portion of the user's profile on the third-party online entity, as discussed in more detail below.

The online entity profile portion 438 includes webpage elements through which the user can submit input signals related to the user's online entity profile directly to the website server 350. Thus, based at least in part on/in response to the training instructions described above, the client device 310 can receive via the online entity profile portion 438, one or more input signals (not shown in FIG. 3) associated with the user profile for the third-party online entity. In this manner, the user can receive the instructions relating to the task in one portion of the webpage (i.e., the training page portion 434) and can complete the actions associated with the instructions in a second portion of the webpage (i.e., the online entity profile portion 438). Similarly stated, this arrangement of the training webpage 432 provides training instructions that are integrated with the online entity that is the subject of the training instructions.

Figure 10:
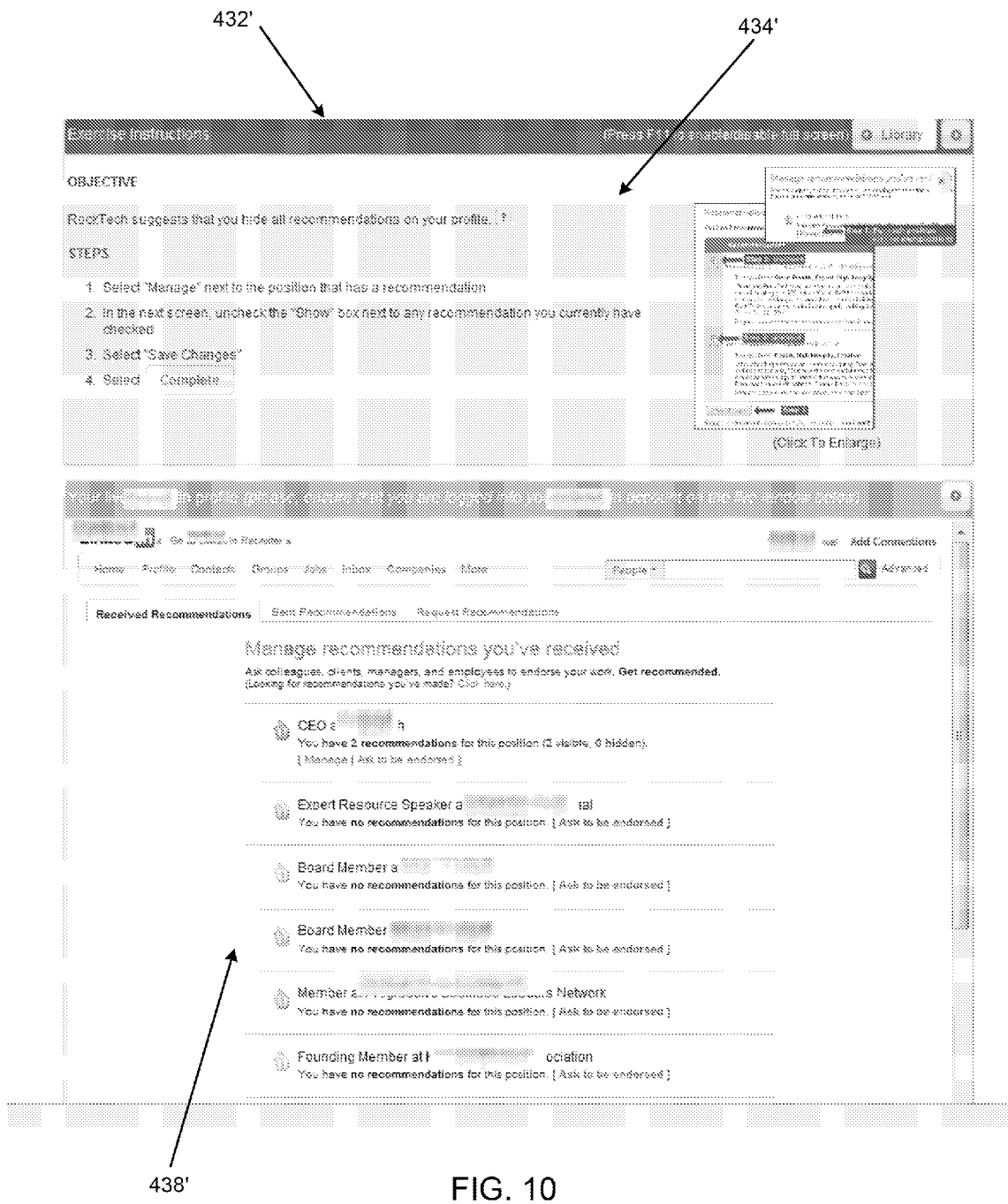

FIG. 10 is another screen shot showing a sample training webpage 432' that includes a training page portion 434' and an online entity profile portion 438'. The sample training webpage 432' is similar to the sample training page 432 described above with reference to FIG. 9, and is therefore not discussed in detail herein.

Referring to FIG. 3, the client device 310 can receive a user input instruction configured to upload a profile picture for the user profile, to add one or more new social network contacts, to add, edit, or delete user personal information to/from the user profile, etc. Based at least in part on this received user input, the client device 310 can send a signal 375 to the website server 350 to effect (i.e., "commit") the change at the website server 350 and/or the website database 360. In this manner, the client device 310 can send a request to update the records of the third-party online entity and thus capture the one or more changes indicated by the received user input signal(s).

In some embodiments, the client device 310 can receive a user input signal (not shown in FIG. 3) indicating completion of the training instructions (i.e., the training task) described above. The client device 310 can receive this user input signal via one or more input elements (e.g., an on-screen button, dialog box, link, etc.) included in the training instruction portion of the rendered webpage. For example, in some embodiments, the client device 310 can receive such an input signal via the input element 436 shown in FIG. 9. Referring again to FIG. 3, based at least in part on the received user input signal, the client device 310 can send a signal 376 to the training server. The signal 376 can include, for example, an indication that the training task has been completed by the user.

In response to the signal 376, the training server 330 can verify that the training task was, in fact, successfully completed by the user. Similarly stated, the training server 330 can monitor the effectiveness with which the training task as been completed. In this manner, the system has the capability to both deliver the instructions and proctor the user's participation in the training task to ensure that the objectives associated with the training task are met. In particular, the training server 330 can send a signal 377 to the website server 350 via the public network 320. In some embodiments, the signal 377 can include a query formatted according to a predefined programming interface associated with the online entity (e.g., the query can be an API-based query). The signal 377 and/or query contained therein can be produced by the training server 330 based at least in part on an identification of the user and the indicated task. Moreover, the signal 377 and/or query contained therein can be configured to verify that information stored by the third-party online entity and associated with the profile of the user indicates that the training task has been successfully completed. For example, the signal 377 can include a query configured to verify that the user has successfully uploaded a profile photo, has added a new contact or target number of new/total contacts, has completed a job description, education history, personal biography, etc.

In some embodiments, the signal 377 (or a corresponding series of signals) can include multiple API-based queries produced by the training server 330 to provide an indication of the status of the training task, the effectiveness with which the user has completed the training task or the like. Each of the API-based queries can include a request for different information associated with the user's profile on the third-party online entity. For example, in certain situations, the training server can formulate a series of API-based queries, the response to which can be cooperatively used by the training server 330 to determine not only whether the user has completed the training task, but also the degree to which (or the efficiency with which) the user has completed the training task. In this manner, the training server 330 can tailor the API-based queries and/or the signal 377 to "grade" the user's performance in completing the training task and/or to produce a measurement of the degree to which the user is applying the objectives set forth in the training task.

The training server 330 can next receive a signal 378, including the requested information, in response to the signal 377 or series of signals (e.g., the API-based query or series of API-based queries). The signal 378, which is received from the website server 350, can include information or data associated with the user profile sufficient to enable the training server 330 to determine whether the training task was successfully completed, the degree to which the training task was completed, a ranking of the user's profile, or the like. Thus, the training server 330 can update a status of the training task associated with the user based at least in part on the information and data within the signal 378. In some embodiments, the information or data is included within the signal 378 is "raw data" and/or is formatted according to the predefined programming interface associated with the online entity (e.g., the response can be an API-based response). In such embodiments, the training server 330 is configured to manipulate the data to determine whether the training task was successfully completed, the degree to which the training task was completed, the ranking of the user's profile, or the like. Such manipulation can include any suitable data manipulation technique, such as, for example, filtering, parsing, merging, transposing or the like.

Figure 11:
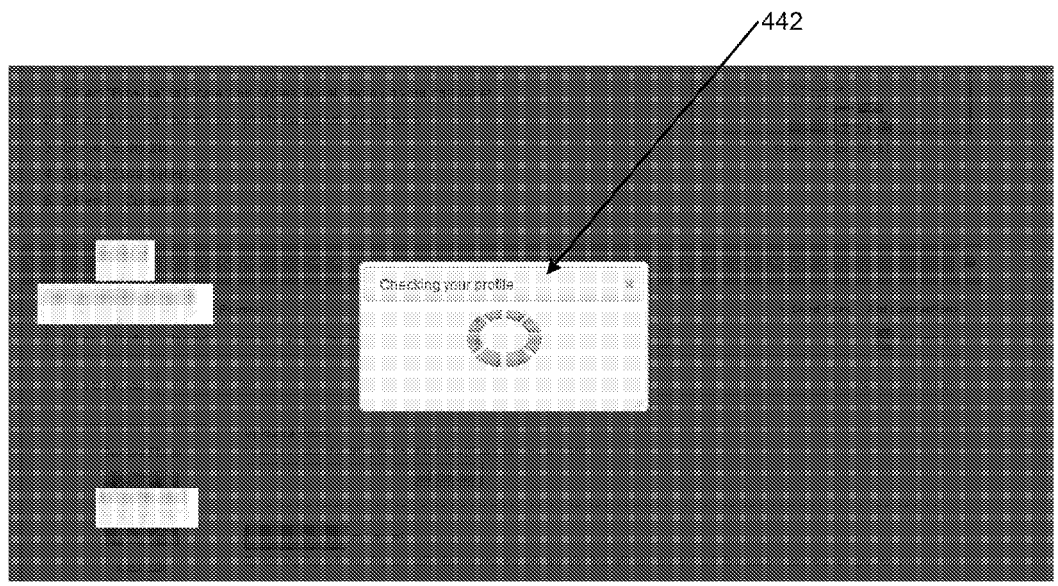
FIG. 11 is a screen shot showing a sample notification according to an embodiment.

During this process, the training server 330 can send a signal (not shown in FIG. 3) indicating that the user's profile on the third-party online entity is being reviewed against the training task and/or objectives. In response, the client device 310 can disable the training webpage (including, for example, the training portion 434 and the online entity profile portion 438) to prevent further user interaction with the third-party online entity while the information is being retrieved. The client device 310 can also display a notification indicating that the user's profile on the third-party online entity is being reviewed against the training task and/or objectives. FIG. 11 is a screen shot showing a sample notification 442. In some embodiments, the notification can include any error messages associated with the sending of the signal 377 and/or the receiving of the signal 378.

Referring again to FIG. 3, based at least in part on the signal 378 and the manipulation of the data contained therein, the training server 330 can send a signal 379 (e.g., a "status signal") to the client device 310 providing an indication of the status of the training task. The signal 379 can, for example, indicate whether the user has successfully completed the next training task, the degree to which the training task was completed, a ranking of the user's profile, or the like. Based at least in part on the signal 379, the client device 310 can output an indication that the user has (or has not) successfully completed the training task. In some embodiments, the indication output by the client device can include both a notification and a user interface and/or input element through which user input can be received.

Figure 12:
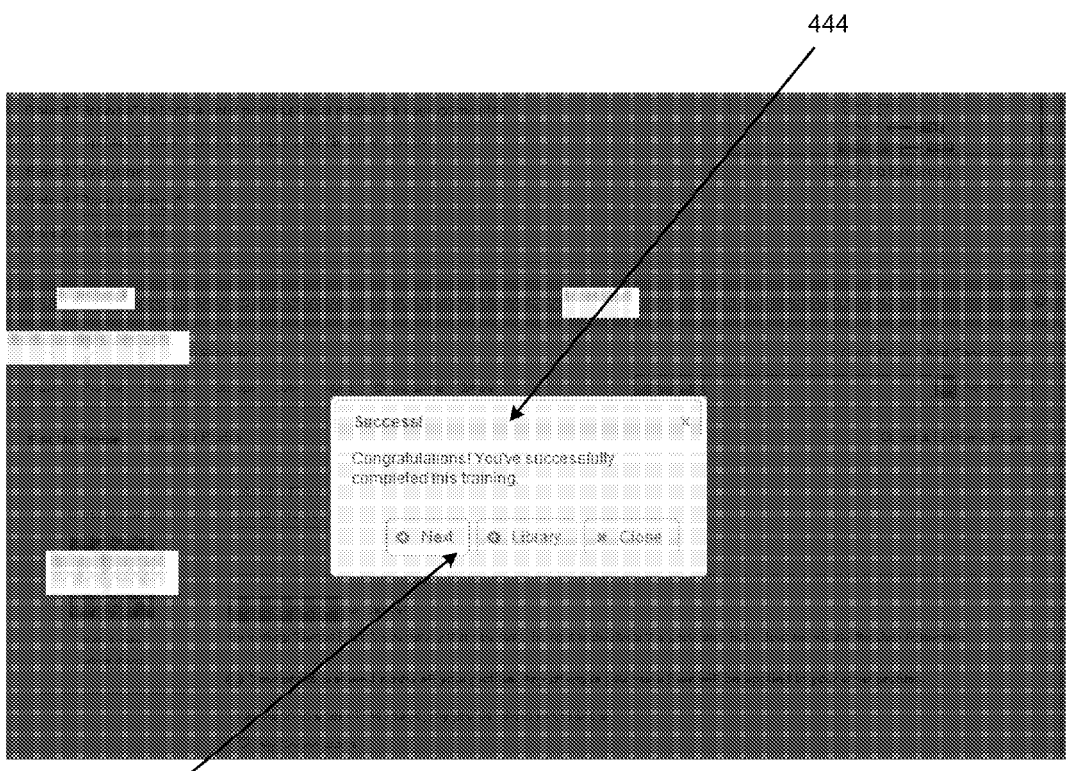
FIGS. 12 and 13 are screen shots of sample notifications having an input element according to an embodiment.
Figure 13:
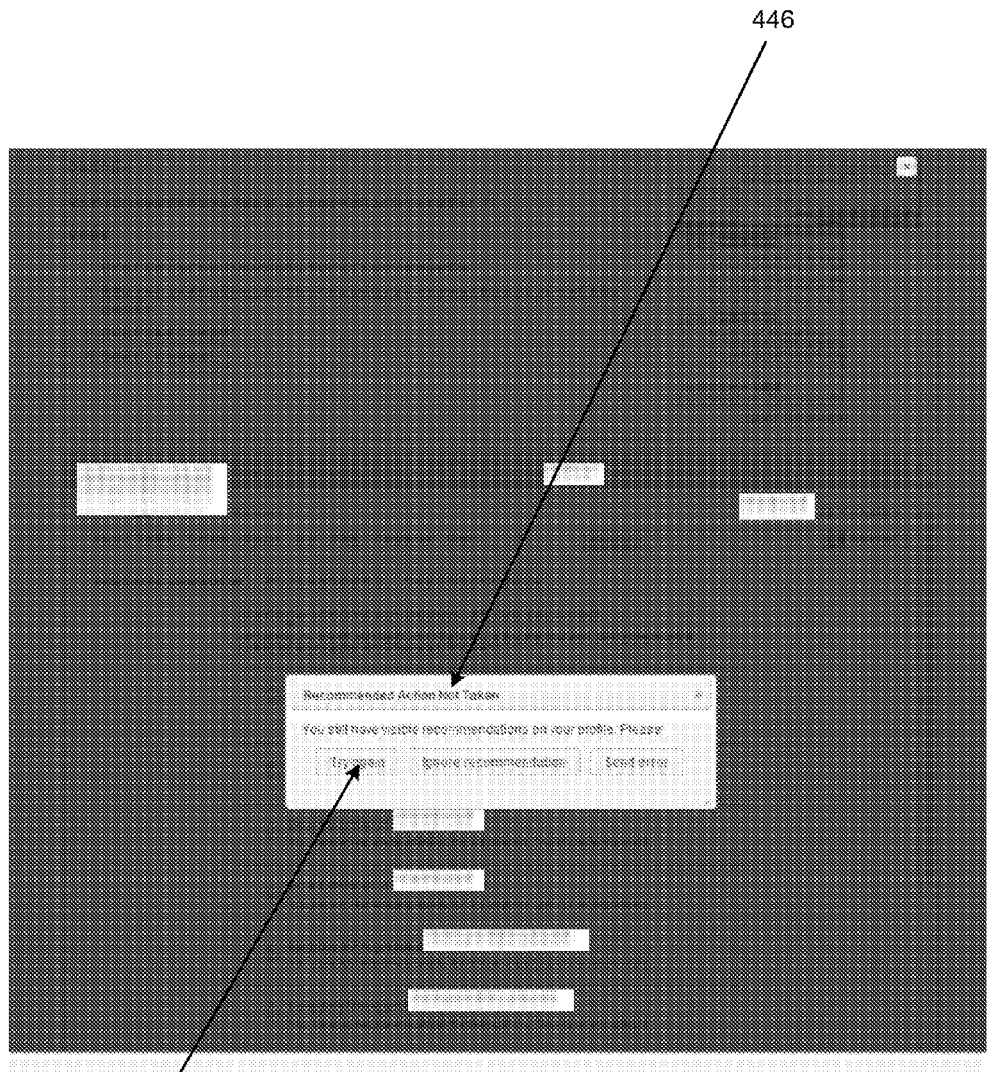

For example, FIGS. 12 and 13 are screen shots of sample notifications with a user interface and/or input element produced by the client device 310, at least in part based on the signal 379. More particularly, FIG. 12 is screen shot including a notification 444 indicating that the user has successfully completed the indicated task and a series of input elements 445 (e.g., the "next" button and the "library" button) through which the client device 310 can receive user input associated with the training program. Thus, if the user has successfully completed the next training task, the client device 310 can render text, an image and/or other media conveying this fact, and can optionally display one or more inputs prompting the user to continue to a subsequent training task.

FIG. 13 is screen shot including a notification 446 indicating that the user has not successfully completed the indicated task and a series of input elements 447 (e.g., the "try again") through which the client device 310 can receive user input associated with the training program. The notification 446 can include a description, based at least in part on the signal 379 and/or the manipulation of the data contained within the signal 379, of the reasons why the indicated task is not considered as being completed. In this manner, the notification can provide more detailed information than simply a "pass/ fail" indication. Thus, if the user has not successfully completed the next training task, the client device 310 can render text, etc., indicating that the failure of the user to complete the next training task, and can optionally prompt the user to make a second attempt to do so. In this scenario, the client device 310 can again follow the sequence of steps and signals described above to receive user input, verify successful completion of the training task, etc. Similarly stated, in some embodiments, in response to an input received from one of the input elements 447, the training server 330 can send a signal causing the client device 310 to redisplay the instructions for the indicated task.

Figure 14:
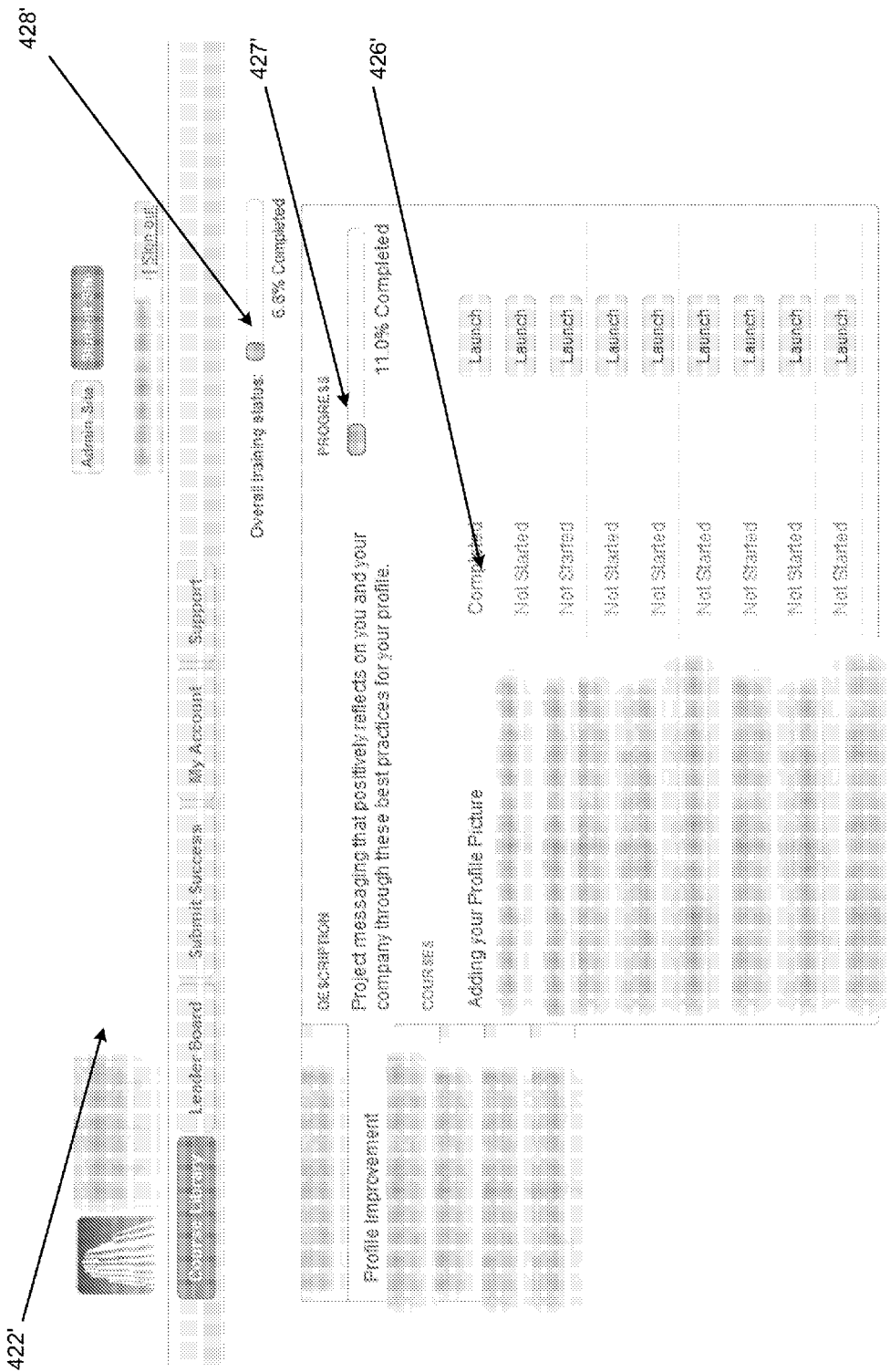
FIG. 14 is a screen shot of a webpage showing a training course webpage according to an embodiment.

In some embodiments, in response to the signal 379 and/or user input received from the input elements (e.g., the input elements 445 shown in FIG. 12 and/or the input elements 447 shown in FIG. 13), the training server 330 can update a status of the user within the training course and/or the overall training program. The training server 330 can also send a signal (e.g., a "progress signal," not shown in FIG. 3) to the client device 310 providing an indication of the user progress within the training course and/or the overall training program. In response, the client device 310 can render an indicator of user progress within the training course. In some embodiments, for example, the training server 330 can send a signal (not shown in FIG. 3) causing the client device 310 to render and/or display the training course webpage and/or user interface with updated status information. FIG. 14 is a screen shot showing a sample training course webpage 422' that includes an updated course status indicator 426', training progress indicator 427' and/or overall training status indicator 428'. The training course webpage 422', including the course status indicator 426', the training progress indicator 427 and the overall training status indicator 428, are similar to the disclosure of the training course webpage 422 shown and described above with reference to FIG. 8, and is therefore not discussed in detail herein.

Figure 15:
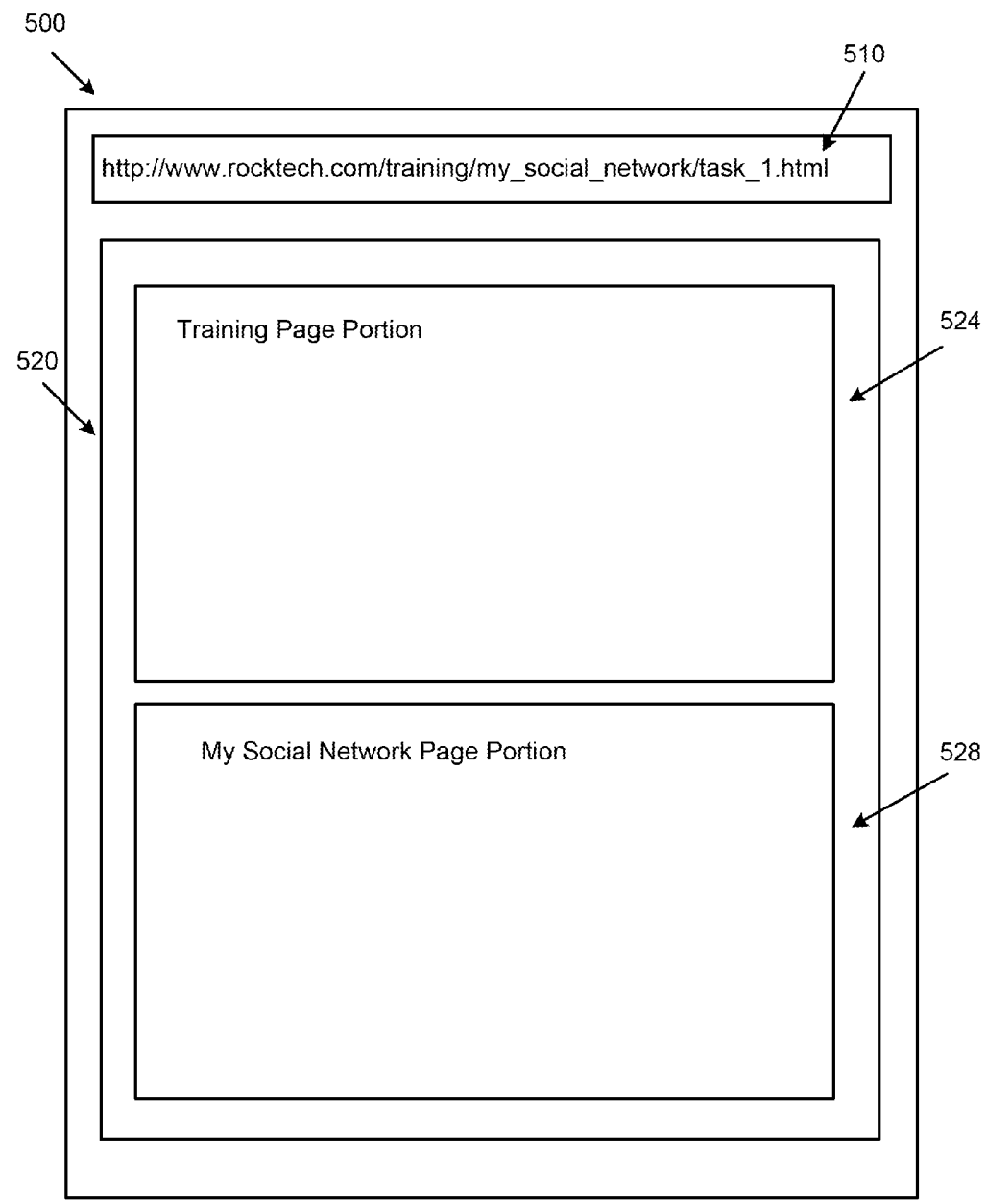
FIG. 15 is a block diagram that illustrates an API-proctored training web page, according to another embodiment.

As discussed above with respect to FIG. 9, in some embodiments, a training server can send signals causing a client device to render a portion of a webpage including the received user profile information from the user's third-party online entity profile. In this manner, the client device can present to the user both (1) a webpage portion from the user's own third-party online entity profile and (2) a webpage portion including training instructions regarding how to perform one or more tasks related to that profile. Similarly stated, in this manner, the training server can cause the client device to produce an interactive or "API-proctored" training webpage. FIG. 15 is a block diagram that illustrates such an API-proctored training webpage, according to another embodiment. More specifically, FIG. 15 illustrates a web browser window 500 including an address bar 510 and a content pane 520. The content pane 520 includes a training page portion 524 rendered based at least in part on instructions received from a training server and a social network page portion 528 based at least in part on instructions received from a website server.

The web browser window 500 can be any application window rendered/executing at a client device, such as a desktop computer, laptop/portable computer, tablet computing device, personal digital assistant (PDA), smartphone, mobile phone, etc. In some embodiments, the client device can be similar to the client device 310 described in connection with FIG. 3 above. The web browser window 500 can be defined by, included in and/or rendered by a web browser application or process executing at the client device. The web browser window 500 can be, for example, an Internet Explorer, Mozilla Firefox, Google Chrome, Apple Safari, KDE Konqueror, or other browser window.

As shown in FIG. 15, the web browser window 500 can include an address bar 510. The address bar 510 can be a dialog box or other user interface (UI) element configured to display a current address (e.g., a uniform resource locator (URL)) of a webpage being rendered/displayed within the web browser window 500. For example, the address bar can display an address of a webpage sent from/provided by a training server, such as a training task webpage configured to instruct a user of a training course regarding how to complete a training task included in the training course.

The content pane 520 can be a portion of the web browser window 500 configured to include/present/render a web resource, such as the training task webpage described above. In some embodiments, the content pane 520 can display a webpage as defined by one or more elements formatted/defined according to the HTML, JavaScript and/or other formatting, content, scripting and/or other languages. In some embodiments, the content pane 520 can include portions of web content from one or more distinct local and/or remote web servers, such as a web server associated with the training course and a web server associated with a social network (e.g., the web server 350 described in connection with FIG. 3 above).

As shown in FIG. 15, the content pane 520 can include a training page portion 524 and a social network page portion 528. The training page portion 524 can include webpage content associated with a training task of a training course associated with a third-party social network. More specifically, the training page portion 524 can include one or more text, media, interactive and/or other elements configured to instruct a user of the training course regarding how to complete a training task or other task/procedure associated with the third-party social network. To do so, the training page portion 524 can include one or more screenshots, images, video clips, audio clips, text descriptions and/or other elements describing how the user can interact with the social network page portion 528 (described below) in order to complete the training task. In some embodiments, the training page portion 524 can include a training portion similar to the training page portions illustrated in FIGS. 4-14 above. Although not shown in FIG. 15, the training page portion 524 can be a window that overlays (i.e., is in front of) social network page portion 528. In this manner, as a user navigates through various portions of the training, the training page portion 524 can be substantially aligned with the actual relevant portions of social network page portion 528.

In some embodiments, the training page portion 524 can display and/or indicate the status of a user of a training course. For example, the training page portion 524 can indicate a percentage or portion of the training course that has been completed by the user. Alternatively or additionally, the training page portion 524 can indicate whether a user has successfully completed the indicated training task.

Although not shown in FIG. 15, in some embodiments, the training page portion 524 can display instructions configured to instruct the user of the training course how to complete a training task the completion of which cannot be verified by the training page portion 524 or an associated training server. To do so, the training page portion 524 can include detailed instructions regarding the training task, including one or more screenshots configured to indicate to the user precisely how to complete the training task within the social network page portion 528.

In some embodiments, the training page portion 524 can include one or more UI elements configured to allow a user to indicate that the training task has been completed. The one or more UI elements can be, for example, one or more clickable elements (e.g., buttons, such as a submit button). In response to selection of and/or user input related to the one or more UI elements, the training page portion 524 can send a request to a device/server associated with the third-party social network to determine whether the user has successfully completed the indicated training task. To do so, the training page portion 524 can, for example, send a dynamic request (e.g., an HTTP request) to the device/server of the third-party social network (e.g., a website server and/or database such as the website server 350 and the website database 360 described in connection with FIG. 3 above).

In some embodiments, the training page portion 524 can receive a response to the dynamic request from the third-party social network server/device. The response can optionally include an indication as to whether the training task was successfully completed. Alternatively, the response can include data associated with a profile of the user of the third-party social network. In the latter instance, the training page portion 524 can include code and/or logic configured to determine, based on the received data associated with the profile of the user, whether the user has successfully completed the training task. For example, if the training task is to upload a profile photo, the training page portion 524 can determine, based on the received response to the dynamic request, whether the user has uploaded a profile photo. Alternatively, if the training task is to acquire a predetermined number of social network contacts or friends, the training page portion 524 can determine, based on the received response, whether the user's current number of social network contacts/friends exceeds the predetermined number. Based at least on the above-described determination, the training page portion can output, via the training page portion 524 of the content pane 520, text and/or other display information indicating whether the user has successfully completed the user task.

The social network page portion 528 can include webpage content associated with a third-party social network with which the user has an account and/or a profile (e.g., a profile page). In some embodiments, the social network page portion 528 can include webpage content provided by/sent from one or more devices or servers of the third-party social network. This webpage content can be, for example, one or more screens or webpages, such as an edit profile screen/webpage, a user account/settings screen/webpage, etc.

In some embodiments, the social network page portion 528 can include webpage elements (defined, e.g., in HTML, JavaScript, etc.) configured to allow a user to submit input signals (e.g., text data, UI element interaction (e.g., button presses), etc.) related to, for example, the user's profile. Upon receipt of the user input signals, the social network page portion 528 can submit data related to the same to a remote device and/or server associated with the third-party social network (e.g., the website server 350 and/or the website database 360 described in connection with FIG. 3 above). In this manner, the social network page portion 528 can provide functionality allowing a user to effect one or more changes, additions, deletions, etc. associated with the third-party social network (e.g., one or more changes to a profile of the user).

In some embodiments, a training server can send one or more API-based queries and receive the corresponding data from an online entity, as described above, to determine the effectiveness with which the user has completed the training task. Specifically in some embodiments, a training server can "grade" or "rank" the user's interaction with the online entity to determine the effectiveness with which the user has completed the training task and/or the degree to which the user is applying the objectives set forth in the training task. For example, in some embodiments, the training server can cause a client device to present a training course directing the user to complete a series of different tasks, the completion of which will result in a fully updated user profile. The training tasks can include, for example, instructions to add contact information to the user profile, add a photo to the user profile, updating the user's employment or education information in the user profile or the like. The training server can then produce a series of queries and receive data associated with each training task presented to a user. In some embodiments, the training server can produce a ranking (or grade) of the user's profile based on the number of tasks successfully completed.

The training server can produce a ranking (or grade) of the user's profile based on any suitable metric. For example, in some embodiments, the training server can receive a datum associated with a training task presented to a user. The training task can include, for example, instructions directing the user to add a target number of contacts to their user profile, and the datum returned by the online entity can include a current number of contacts included within the user's profile. In this example, the training server can produce a ranking (or grade) the user's profile based on a comparison between the current number of contacts and the target number of contacts.

In other embodiments, the training server can evaluate the user's profile to determine whether the user has successfully added a target number of social network contacts having a particular characteristic. Such characteristics can include, for example, whether the contact is associated with a particular industry, has achieved a particular level of advancement, has a particular type of educational degree or the like. In some embodiments, the training server can produce multiple different queries configured to result in the receipt of different data from the third-party online entity, which can be manipulated and/or aggregated to grade and/or rank the user's profile. In this manner, the training server and/or the system can produce a ranking of the degree to which the user is completing the training task and/or the degree to which the user is applying the objectives set forth in the training task.

In some embodiments, a training server can send one or more API-based queries and receive the corresponding data from an online entity, as described above, for a group of different users. The group of users can be, for example, the employees within a particular group. The training server can determine the effectiveness with which each user has completed the training tasks presented, as described above, and can "grade" or "rank" a user's interaction with the online entity relative to the other users from the group. In this manner, the training server can aggregate the results from the API-based queries to determine the effectiveness with which a group of users has completed the training task and/or the degree to which the group of users is applying the objectives set forth in the training task.

Figure 16:
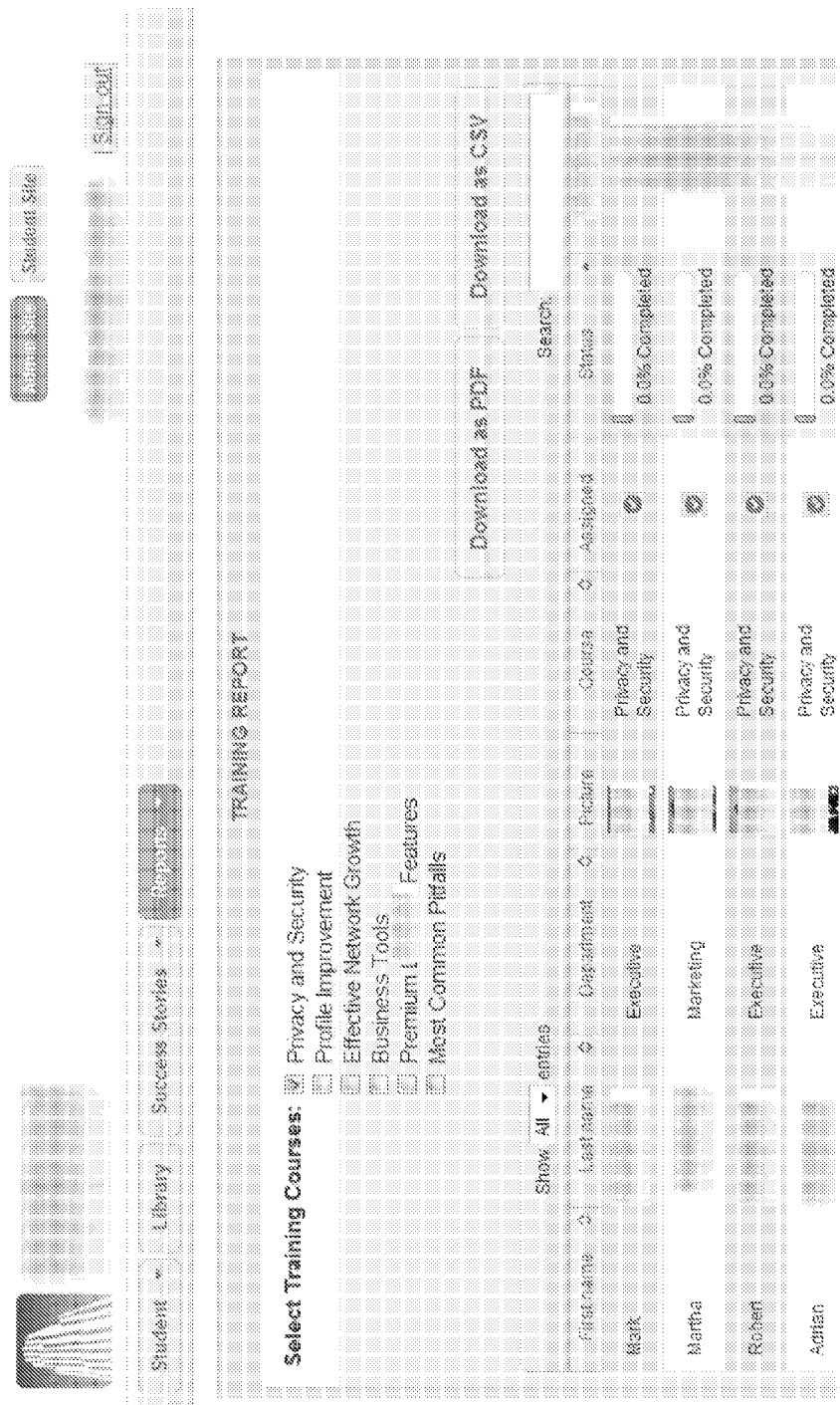
Figure 17:
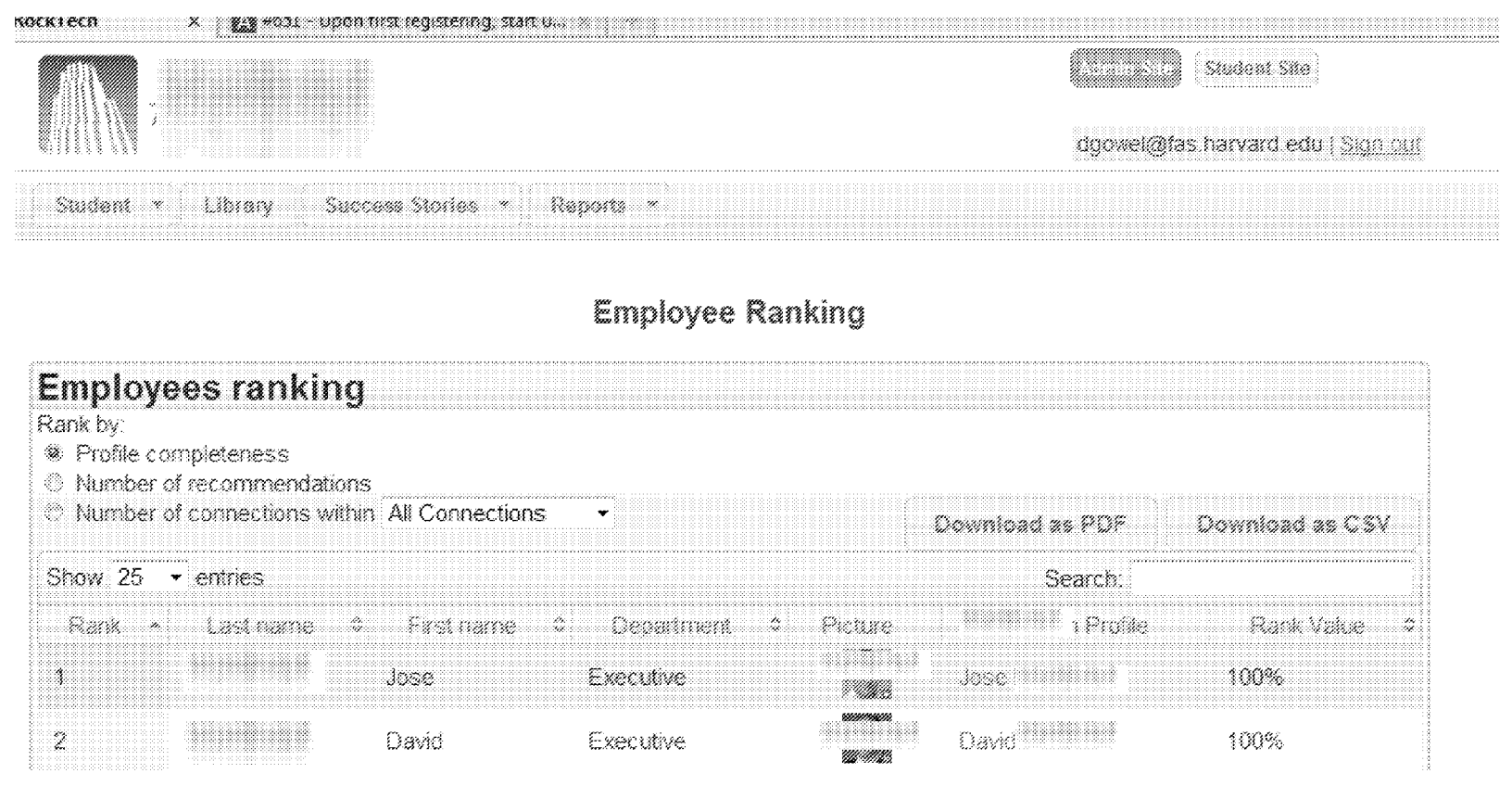
Figure 18:
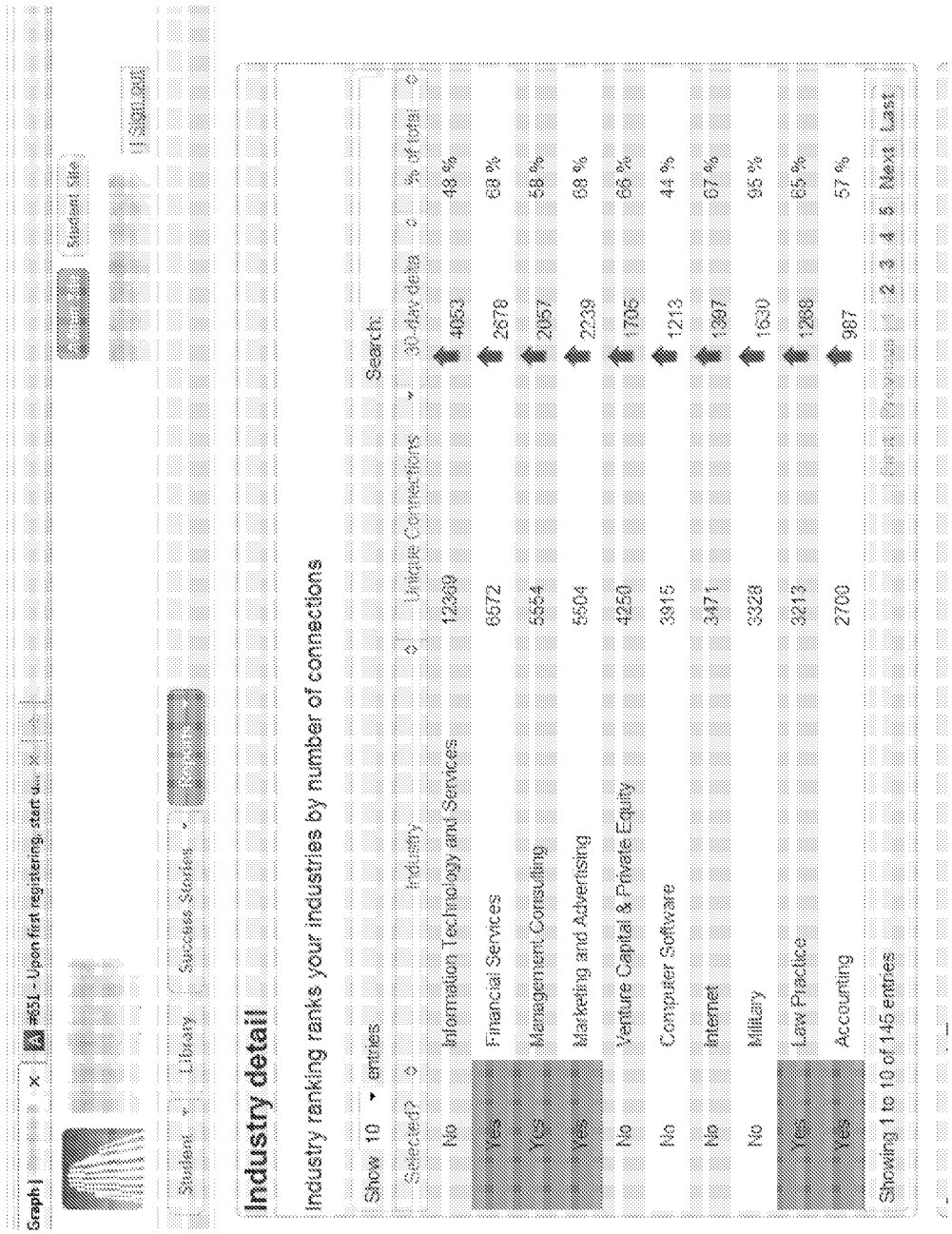

In some embodiments the system can identify a supervisor or "admin user" and provide to a client device associated with the supervisor one or more signals causing the client device to display the status, ranking and/or profile grades for each user from a group of users. FIGS. 16-18 are screen shots showing sample reports that can be displayed at the client device (e.g., client device 310).

In some embodiments, a training server can aggregate the contacts associated with each user from a group of users into a signal social network that can be accessed by a supervisor, as disclosed in U.S. Provisional Application No. 61/421,827, entitled "Systems and Methods for Integrating Personal Social Networks Within An Organization," filed Dec. 10, 2010, which is herein by reference in its entirety.

Although the signal 377 (or a corresponding series of signals) is described above as being produced and/or sent in response to user input received from the client device 310, in other embodiments, the signal 377 (or API-based query) can be produced and/or sent at a predetermined time. Similarly stated, in some embodiments, the "polling" of the third-party online entity can be time-based rather than input-based. In this manner, the training server (e.g., the training server 330) can produce a status and/or grade of the user's profile as a function of time.

For example, in some embodiments, the time-based polling can include a series of signals each sent at a predetermined time interval after the previous query and/or at a predetermined time interval after the delivery of the training task. For example, in some embodiments, the training server 330 can send a series of signals 377 to the website server 350 each at a predetermined time interval after the previous signal in the series. For example, in some embodiments, the training server 330 can send a signal 377 including a query to the website server 350 every twenty-four hours after the delivery of the training task. In this manner, the training server 330 can continually monitor whether the user has completed the training task (or the degree to which the training task has been completed).

Such "periodic polling" can be completed independently from the client device 310. For example, in some embodiments the training server 330 can periodically poll the website server 350 even when the training program is not being displayed (i.e., is not being executed on) the client device 310. In this manner, the training server can monitor the user's activity associated with the third-party online entity that is completed outside of the training system (e.g., in a manner not associated with the training webpage 434 and/or the online entity profile page 438), and can provide "credit" to the user for such activity (e.g., by updating the user's ranking, as described herein).

Figure 19:
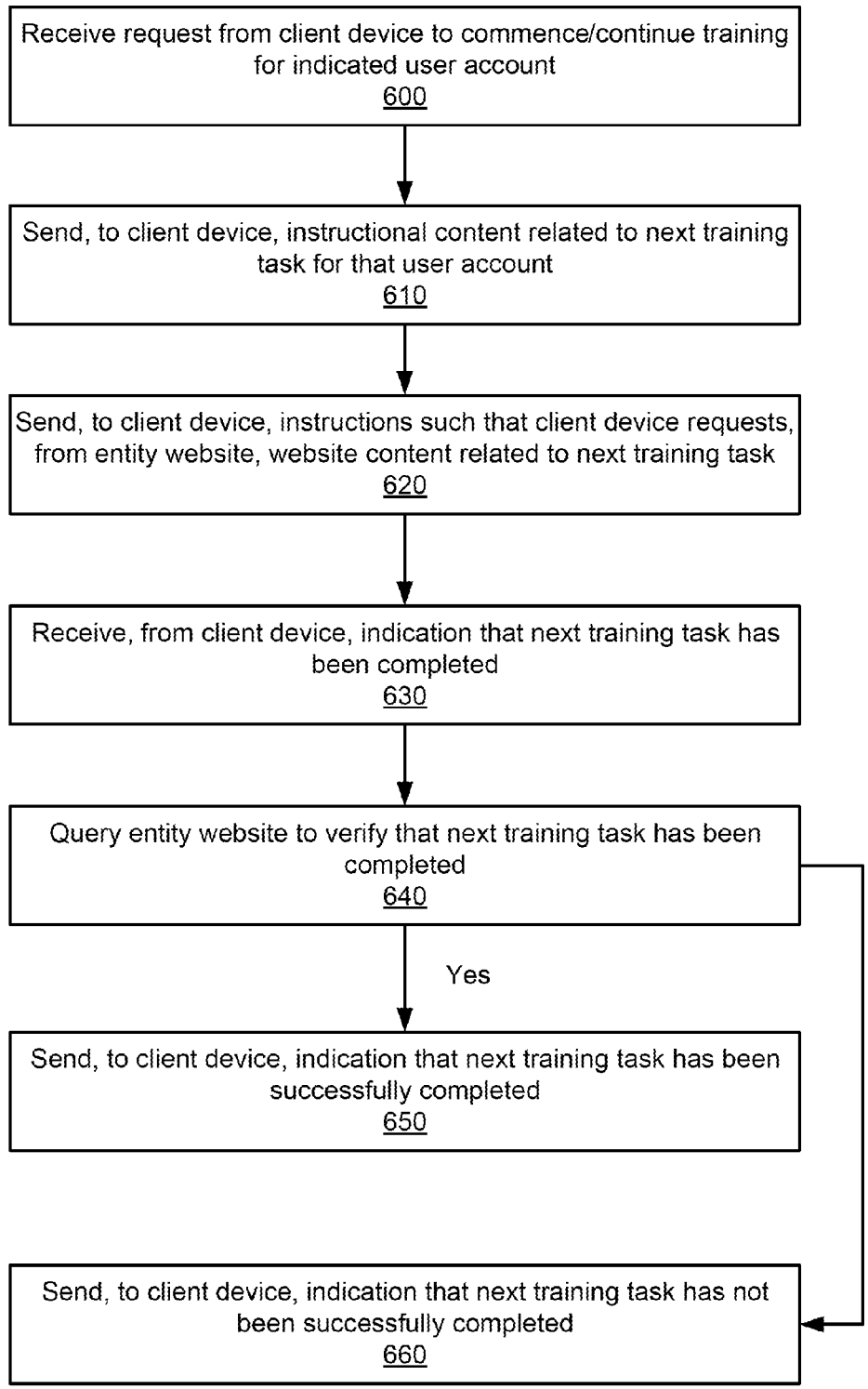
FIG. 19 is a flow diagram that illustrates a method according to an embodiment.

In some embodiments, the periodic polling can continue until the training task has been successfully completed. Upon successful completion of the training task, the training server 330 can issue a notification to the client device 310 to notify the user that the task is considered as having been completed and/or that the user's ranking has been updated. In other embodiments, the period polling can continue for a predetermined period of time (e.g., until the expiration of a training license, etc.). FIG. 19 is a flow diagram that illustrates a method of providing online instruction regarding an online training task associated with a third-party entity and verifying successful completion of the same via one or more API calls, according to an embodiment.

A training server can receive a request from a client device to commence or continue a training course associated with an indicated user account, 600. In some embodiments, the training server can be any valid combination of hardware and/or software (executing in hardware) configured to administer (e.g., serve web content related to) an online training course associated with a third-party entity, such as a social network not operated by or directly affiliated with the training course. A user of the training course can be associated with a user account pertaining to or associated with the training course (i.e., stored in one or more memories/databases in communication with the training server). The user of the training course can also be associated with a social network account associated with the third-party entity. The request can be received from the client device via a network, such as a private network and/or a public network (e.g., the Internet). In some embodiments, the request can be included in an HTTP request sent from a web browser of the client device.

The training server can send, to the client device, instructional content (e.g., web content containing instructional text and/or media) related to a next training task for completion by the user of the user account, 610. In some embodiments, the instructional content can include one or more instructions configured to indicate to the user how to accomplish a specified task within the third-party social network (e.g., upload a profile photo, add a specified number of contacts, etc.) In some embodiments, the instructional content can be configured to be displayed in a portion of a web browser (of, e.g., a web browser module/application executing at the client device), such as a content pane associated with the training course (e.g., the content pane 520 described in connection with FIG. 15 above).

The training server can optionally send, to the client device, additional instructions (e.g., HTML) configured to cause the client device to request, from the third-party entity, website/webpage content related to the next training task, 620. For example, the training server can send, to the client device, one or more Uniform Resource Locators (URLs) included within HTML code received by the client device. Upon receipt of the HTML code, the web browser module/application can accordingly request webpage content from the third-party social network based at least in part on the included/embedded URLs. Based at least in part on one or more responses (e.g., HTTP responses) received from the third-party social network, the web browser application/module can display, within a portion of the content pane associated with the third-party social network, a portion of one or more social network webpages. In this manner, the web browser can provide a means by which the user can interact with the third-party social network and provide user input configured to complete the training task described above.

The training server can optionally receive, from the client device, an indication that the training task has been completed, 630. For example, the training server can receive a signal from the web browser executing at the client device that includes an indication of one or more user inputs. The user inputs can indicate, for example, that the user has pressed a button, selected an option from a drop-down list, etc., indicating that the next training task has been completed by the user (e.g., based on one or more inputs/actions taken within the portion of the web browser content pane associated with the third-party social network).

Based at least in part on the received indication described in step 630 above, the training server can next query the third-party entity/social network website to verify that the next training task has been completed, 640. More specifically, the training server can send a request to a device (e.g., a server or database) associated with the third-party entity including a query associated with the next training task and the user account. The request can be formatted according to an API associated with the third-party entity, the API being defined to enable provision of data associated with the third-party entity (e.g., social network information, such as profile information associated with a user account). In some embodiments, the request can be sent directly to the device associated with the third-party entity (via, e.g., a public network such as the Internet and/or a private network). In some embodiments, the request can be sent indirectly from the training server through/via the client device, with the client device receiving an instruction to send/forward the request to the device associated with the third-party entity. If the training server receives an affirmative ("yes") response from the device associated with the third-party entity, the training server can proceed to step 650 described below. Alternatively, if the training server receives a negative ("no") response, the training server can proceed to step 660, also described below.

If the training server receives a response/indication that the next training task has in fact been successfully completed by the user, the training server can send, to the client device, an indication of the same, 650. For example, the training server can send a signal to the web browser executing at the client device such that the web browser displays a text, graphical, video, or other indication that the next training task has been completed. In some embodiments, the signal can be configured to cause the web browser to display (e.g., in the portion of the content pane associated with the training course) an updated training course progress indicator for the user account, indicating (e.g., indicating graphically, indicating via text, etc.) a portion, percentage and/or amount of the training course that has been completed by the user of the user account. In some embodiments, the displayed information can include congratulatory text based on the user's completion of the next training task. In some embodiments, the signal can be configured to cause the web browser to display a UI component configured to allow the user to indicate a desire to view/complete a subsequent training task associated with the training course and/or a different training course. Although not shown in FIG. 19, in some embodiments, the web browser executing at the client device can receive an indication regarding the completion/incompletion of the next training task directly from the device associated with the third-party entity, and can accordingly display text, graphics, etc., based thereon within portion of the content pane associated with the training course. The signal sent to the client device can be any suitable signal and/or form of communication. As described above, in some embodiments, the web browser on the client device can display an indication associated with the signal. In other embodiments, the signal can be an e-mail, SMS or the like that notifies the user of the status of the training task. In some embodiments, the client device need not display the signal and/or any content associated with the signal upon receipt of the signal.

If the training server receives a response/indication that the next training task has not been successfully completed by the user, the training server can send, to the client device, an indication of the same, 660. More specifically, the training server can send a signal to the web browser executing at the client device including text, graphics, video and/or other media indicating that the user has not successfully completed the next training task. Based at least in part on this received signal, the web browser can display, within the portion of the content pane associated with the training course, the received media and/or indication. In some embodiments, the web browser can also display one or more UI components configured to allow the user to indicate a subsequent time that the next training task has been completed.

Figure 20:
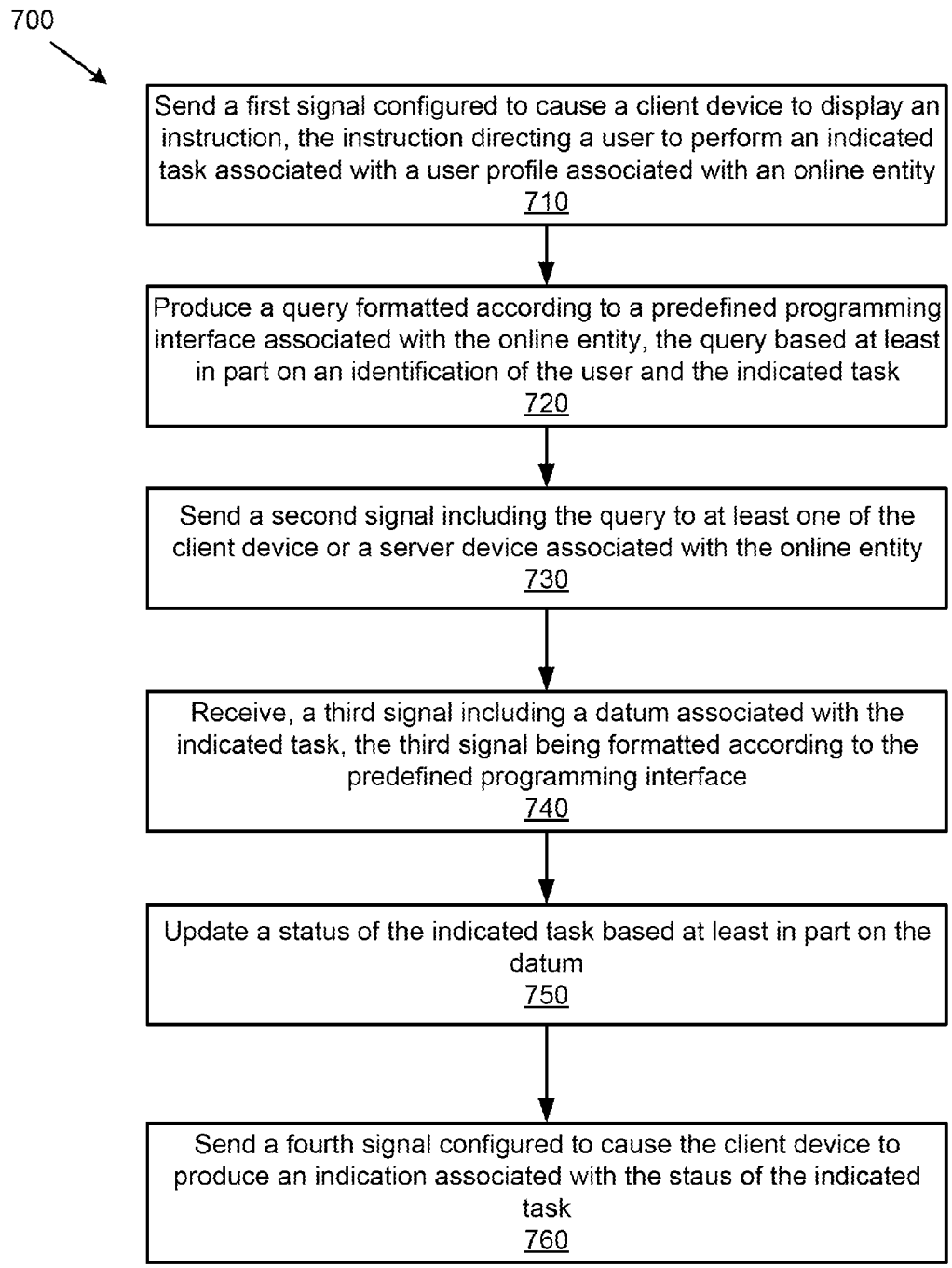
FIG. 20 is a flow diagram that illustrates a method according to an embodiment.

FIG. 20 is a flow diagram that illustrates a method 700 of providing online instruction regarding an online training task associated with a third-party entity and verifying successful completion of the same according to an embodiment. The method 700, which can be performed by any of the hardware and/or software systems described herein, includes sending a first signal to cause a client device to display an instruction, 710. The instruction directs a user to perform an indicated task associated with a user profile associated with an online entity. The instruction can, for example, direct the user to add a photograph to their user profile.

A query formatted according to a predefined programming interface associated with the online entity is produced, 720. The query is based at least in part on an identification of the user and the indicated task. In some embodiments, the query can be an API-based query or an "API call," as described herein. In some embodiments, a series of queries can be produced.

A second signal including the query is sent to the client device or a server device associated with the online entity, 730. In response to the query, a third signal including a datum associated with the indicated task is received, 740. The third signal is formatted according to the predefined programming interface. In some embodiments, the third signal can be an API-based signal, as described herein.

A status of the indicated task is updated based at least in part on the datum, 750. The method includes sending a fourth signal configured to cause the client device to produce an indication associated with the status of the indicated task, 760.

Figure 21:
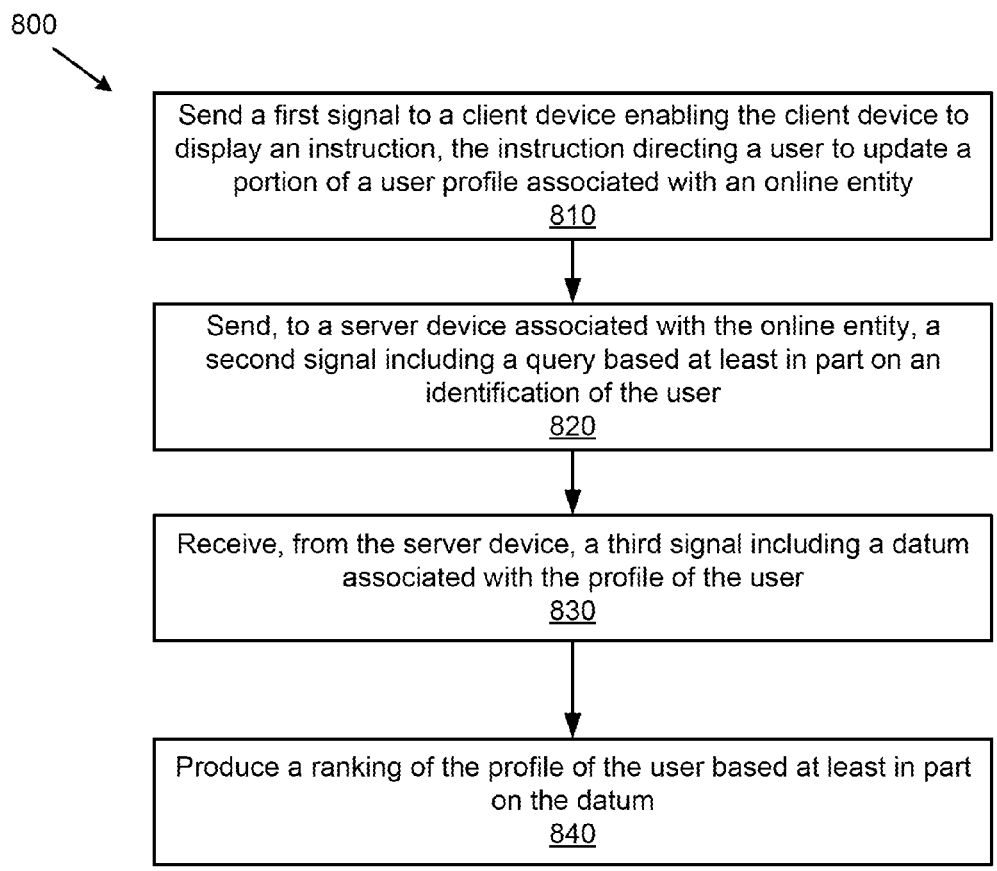
FIG. 21 is a flow diagram that illustrates a method according to an embodiment.

FIG. 21 is a flow diagram that illustrates a method 800 of producing a ranking of a user's profile of an online entity according to an embodiment. The method 800, which can be performed by any of the hardware and/or software systems described herein, includes sending a first signal to a client device enabling the client device to display an instruction, 810. The instruction directs a user to update a portion of a user profile associated with an online entity.

A second signal including a query based at least in part on an identification of the user is sent to a server device associated with the online entity, 820. The second signal can be, for example, an API-based query of the types shown and described herein. In some embodiments, for example, a series of API-based queries can be produced and/or sent to the server device.

A third signal including a datum associated with the profile of the user is received from the server device, 830. Based at least in part on the datum, a ranking of the profile of the user is produced, 840. In some embodiments, the ranking can be based upon a comparison between certain data within the user profile and a target provided in the instructions. In other embodiments, the ranking can be based on a comparison of the user profile to the profile of other users within a group.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and read-only memory (ROM) and RAM devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Where methods described above indicate certain events occurring in certain order, the ordering of certain events may be modified. Additionally, certain of the events may be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described. For example, a mobile device validation system can include multiple access servers configured to authenticate one or more mobile device users and/or to validate one or more client mobile devices.

Although the online entities are described herein as being third-party online entities (i.e., an online entity that is separate from, distinct from and/or not controlled by the training server), in other embodiments, an online entity can be associated with the training server. Similarly stated, in other embodiments an online entity can be controlled by and/or managed by a party associated with the training server, or vice-versa. In yet some additional embodiments, the online entity can share common hardware with the training server. The training server, whether or not owned by the entity that is the subject of the training, can be integrated with the entity's systems or can communicate with the entity's systems by use, for example, of an API as described above. In embodiments in which the training server is integrated directly into the entity's systems, an API is not required. The various instructions and interactions between the client device and training server/program, however, are functionally similar to that described above.

Although certain methods are described above as validating the completion of certain instructions associated with an online entity based on data received in response to an API-based query, in other embodiments, a status of a task can be updated in response to data received from a source other than the online entity. For example, in some embodiments, a status of a task can be updated base on a response received from the client device and/or the user.

Although shown in FIG. 3 as being sent by the training server 330 in response to the signal 376, in other embodiments, the client device 310 can alternatively send the signal 377 in response to the received user input indicating completion of the next training task. For example, a web browser executing at the client device 310 can send, using Asynchronous JavaScript and XML (AJAX), the signal 377 to the website server 350 or another server associated with the third-party online entity (not shown in FIG. 3). In such embodiments, the client device 310 can receive the signal 378 directly from the website server 350 and accordingly render an appropriate indication as described above, without receiving the subsequent signal 379 from the training server 330.

Although the training server 330 is shown in FIG. 3 as sending the signal 377 to the website server 350 via the public network 320, in other embodiments, the training server 330 can send the signal 377 directly to the website database 360.

Although the training server 330 is shown and described above as producing and sending a query (i.e., the signal 377) based at least in part on an identification of the user and the indicated task, in other embodiments, the training server 330 can produce and send a query based at least upon additional data associated with the user. Such data can originate from any suitable data source, such as for example, the on-line entity that is the subject of the training task, another third-party entity (e.g., the user's employer, the entity that is subscribing to the training program on behalf of the user or the like) and/or public databases. For example, in some embodiments, the training server 330 can produce a query based at least in part on the user's level of experience, position and/or department within an organization. In this manner, the training server 330 can tailor the API-based queries and/or the signal 377 to "grade" the user's performance based at least in part on specific information associated with the user. More particularly, a user having limited experience and who is working in an entry-level department may have different targets and/or thresholds for a "successful" completion of a training task than would a user having vast experience and who is working in an advanced department.

Moreover, in some embodiments, such additional data associated with the user can be used to select the next training task to be presented to the user. Thus, the training program for each user can be tailored specifically for that user, based on the additional data. For example, a training program may include different tasks related to different aspects of a third-party online entity based on the data associated with user. For example, certain users may have different privacy needs (e.g., based on their position within an organization, previous positions or the like), and may therefore require additional training tasks associate with privacy settings than would other users. In some embodiments, the training program can be customized automatically for each user based a rule set and the additional data.

Although the notifications and indications, such as, for example, the notifications shown in FIGS. 12 and 13, are shown and described as being visual notifications produced by the client device (e.g., the client device 310), in other embodiments, any of the notifications described herein can be rendered via any suitable type of output. Such types of outputs can include, for example, audible output (beeps, alarms, recorded voice outputs or the like) or haptic outputs.

Figure 22:
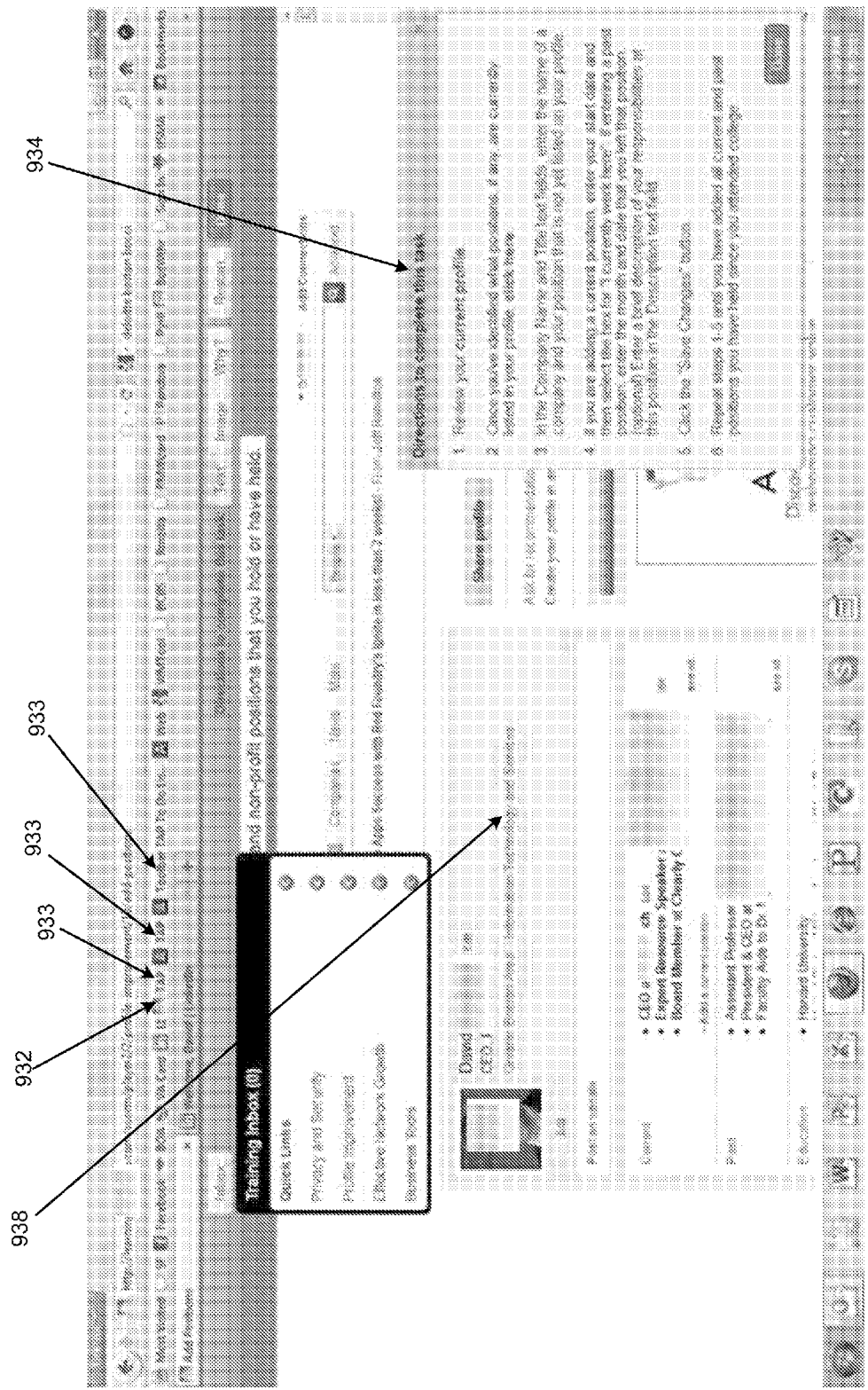
FIG. 22 is a screen shot of a training toolbar according to an embodiment.

Although the training webpages (e.g., the training webpage 432 and the training webpage 532) are shown and described above as including a training page portion within which a training task is presented, in other embodiments, a training task can be presented by a client device in any suitable format. For example, in some embodiments, a training server can send one or more signals causing a client device to display a training toolbar through which one or more training tasks can be presented. For example, FIG. 22 is a screen shot showing a sample training toolbar 932 that includes a series of user input elements 933 associated with the training program. In use, when the user provides input via a one of the elements (i.e., the user selects an element), the training server can send one or more signals to produce a training page portion 934. The training page portion 934, which provides instructions as described above, can be rendered along with an online entity profile portion 938, thereby allowing the user to interactively complete the training task, as described above.

Although the system is described as interfacing with a particular third party site, in some embodiments, the training page can interface with multiple third party sites. For example, the training page may provide links to multiple different sites such that the user can navigate between different accounts, profiles, etc. in a single training session. In such embodiments, the user can navigate back and forth between profiles to perform various tasks (e.g., synchronizing contacts). As the training window persists, the underlying page (e.g., social network page portion) changes. Such workflow between various sites/systems can prevent the need for multiple separate training interfaces.

What is claimed is:

1. A non-transitory processor-readable medium storing code representing instructions that when executed cause a processor to:
send a first signal configured to cause a client device to display an instruction, the instruction directing a user to perform an indicated task associated with a profile of the user, the profile of the user being associated with an online entity;
produce a query formatted according to a predefined programming interface associated with the online entity, the query based at least in part on an identification of the user and the indicated task;
send a second signal including the query to at least one of the client device or a server device associated with the online entity;
receive a third signal including a datum associated with the indicated task, the third signal being formatted according to the predefined programming interface;
update a status of the indicated task based at least in part on the datum; and send a fourth signal configured to cause the client device to produce an indication associated with the status of the indicated task.

2. The non-transitory processor-readable medium of claim 1, wherein the code further represents instructions configured to cause the processor to:
send a fifth signal configured to cause the client device to redisplay the instruction when the status indicates that the user has not successfully performed the indicated task.

3. The non-transitory processor-readable medium of claim 1, wherein the query is a first query, the datum is a first datum, the code further represents instructions configured to cause the processor to: produce a second query formatted according to the predefined programming interface associated with the online entity, the query based at least in part on the identification of the user and the indicated task; receive a fifth signal including a second datum associated with the indicated task, the fifth signal being formatted according to the predefined programming interface; and update the status of the indicated task based at least in part on the first datum and the second datum.

4. The non-transitory processor-readable medium of claim 1, wherein the instruction is an instruction from a plurality of instructions associated with a training program, the indicated task is an indicated task from a plurality of indicated tasks, the training program including the plurality of instructions associated with the plurality of indicated tasks associated with the online entity, the code further represents instructions configured to cause the processor to: update a status of the training program based at least in part on the datum; and send a fifth signal configured to cause the client device to produce an indication associated with the status of the training program.

5. The non-transitory processor-readable medium of claim 1, wherein the code further represents instructions configured to cause the processor to: produce a ranking of the profile of the user based at least in part on the datum.

6. The non-transitory processor-readable medium of claim 1, wherein the datum is associated with a number of contacts in the profile of the user, the code further represents instructions configured to cause the processor to: produce a ranking of the profile of the user based at least in part on a comparison between the number of contacts and a target number of contacts.

7. The non-transitory processor-readable medium of claim 1, wherein the user is a first user from a plurality of users, the code further represents instructions configured to cause the processor to: produce a ranking based at least in part on the datum, the ranking comparing the profile of the user to a profile of each user from the plurality of users.

8. The non-transitory processor-readable medium of claim 1, wherein: the indicated task is a first indicated task from a plurality of indicated tasks; and the indication associated with the status of the indicated task includes a notification stating whether the user has successfully completed the first indicated task and a user interface through which user input associated with at least one of the first indicated task or a second indicated task can be received.

9. The non-transitory processor-readable medium of claim 1, the code further represents instructions configured to cause the processor to: send a fifth signal configured to cause a client device to display a portion of a webpage associated with the online entity.

10. The non-transitory processor-readable medium of claim 1, wherein the online entity is a social networking service and the indicated task includes submission of at least one of a profile picture of the user, employment information associated with the user, education information associated with the user, or website information associated with the user.

11. The non-transitory processor-readable medium of claim 1, the code further represents instructions configured to cause the processor to: receive, from the client device, a fifth signal including an indication that the user has performed the indicated task, the second signal is sent in response to the receipt of the fifth signal.

12. The non-transitory processor-readable medium of claim 1, wherein the predefined programming interface is an application programming interface (API) associated with the online entity.

13. A computer system for delivering a training program including a plurality of instructions, the computer system comprising:
a memory; and a plurality of modules configured to deliver the training program to a client device via a network operatively coupled to the computer system, at least a portion of at least one of the plurality of modules being stored in at least a portion of the memory, the plurality of modules including:
a training module configured to send a first signal configured to cause the client device to display an instruction from the plurality of instructions, the instruction directing a user to perform an indicated task associated with a profile of the user, the profile of the user being associated with an online entity; and
a validation module configured to produce a query formatted according to a predefined programming interface associated with the online entity, the query based at least in part on an identification of the user and the indicated task, the validation module configured to send a second signal including the query to at least one of the client device or a server device associated with the online entity and receive a third signal including a datum associated with the indicated task, the third signal being formatted according to the predefined programming interface, the validation module configured to update a status of the indicated task based at least in part on the datum.

14. A non-transitory processor-readable medium storing code representing instructions configured to cause a processor to:
send, to a client device, a first signal configured to cause the client device to display at least a portion of a web resource associated with an online service;
send, to the client device, a second signal configured to cause the client device to display an instruction associated with a user task, the user task being associated with a user account associated with the online service;
receive, from the client device, a third signal including a first indication that the user task has been performed;

send, to a device associated with the online service, a fourth signal including a request configured to determine whether the user task has been performed, the request being formatted according to a predefined protocol associated with the online entity;

receive, from the device associated with the online service, a fifth signal including a second indication that the user task has been performed, the second indication being formatted according to the predefined protocol; and send, to the client device, a sixth signal configured to cause the output device to display an indication that performance of the user task has been verified.

15. The non-transitory processor-readable medium of claim 14, wherein the portion of the web resource and the instruction are displayed in a web browser executing at the client device.

16. The non-transitory processor-readable medium of claim 14, wherein the user task is associated with a profile associated with the user account.

17. The non-transitory processor-readable medium of claim 14, wherein the code further represents instructions configured to cause the processor to: send, to the device associated with the online service, a seventh signal including a request for access to information associated with the user account; and receive, from the device associated with the online service, an eighth signal configured to grant access to the information associated with the user account.

18. The non-transitory processor-readable medium of claim 14, wherein the code further represents instructions configured to cause the processor to: send, to the client device, a seventh signal configured to cause the output device to display an indication of a status of the user account in a training course associated with the online service and the user task.

* * * * *